(12) United States Patent
Gao et al.

(10) Patent No.: US 11,164,733 B2
(45) Date of Patent: Nov. 2, 2021

(54) FABRICATION OF MASS SPECTROMETRY SURFACE

(71) Applicant: The Regents of the University of California, Oakland, CA (US)

(72) Inventors: Jian Gao, Richmond, CA (US); Trent R. Northen, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/759,192

(22) PCT Filed: Oct. 5, 2016

(86) PCT No.: PCT/US2016/055536
§ 371 (c)(1),
(2) Date: Mar. 9, 2018

(87) PCT Pub. No.: WO2017/062481
PCT Pub. Date: Apr. 13, 2017

(65) Prior Publication Data
US 2018/0254177 A1    Sep. 6, 2018

Related U.S. Application Data

(60) Provisional application No. 62/286,084, filed on Jan. 22, 2016, provisional application No. 62/238,589, filed on Oct. 7, 2015.

(51) Int. Cl.
*H01J 49/04* (2006.01)
*H01J 49/00* (2006.01)
(Continued)

(52) U.S. Cl.
CPC .......... *H01J 49/0418* (2013.01); *B82Y 40/00* (2013.01); *H01J 49/00* (2013.01); *H01J 49/0409* (2013.01);
(Continued)

(58) Field of Classification Search
None
See application file for complete search history.

(56) References Cited

U.S. PATENT DOCUMENTS 6,249,080 B1    6/2001    Komoda et al.
6,288,390 B1    9/2001    Siuzdak et al.
(Continued)

FOREIGN PATENT DOCUMENTS

CN          102653390       9/2012
WO       WO2017032481      4/2017

OTHER PUBLICATIONS

Kurczy et al., Nanostructure Imaging Mass Spectrometry: The Role of Fluorocarbons in Metabolite Analysis and Yoctomole Level Sensitivity, in Mass Spectrometry Imaging of Small Molecules (He ed. 2015) at 141 (Year: 2014).*

(Continued)

*Primary Examiner* — James Choi
(74) *Attorney, Agent, or Firm* — Sheppard, Mullin, Richter & Hampton LLP

(57) ABSTRACT

Disclosed herein are compositions for ionizing a target and methods for making the compositions. In some embodiments, the compositions can include a structured substrate having a plurality of upright surface features, for example, microscale or nanoscale pillars, in contact with an initiator. Also disclosed herein are methods for ionizing targets.

20 Claims, 18 Drawing Sheets

(51) Int. Cl.
  *B82Y 40/00*  (2011.01)
  *H01J 49/10*  (2006.01)
  *H01J 49/14*  (2006.01)
  *H01J 49/16*  (2006.01)
(52) U.S. Cl.
  CPC ............ *H01J 49/107* (2013.01); *H01J 49/14* (2013.01); *H01J 49/161* (2013.01)

(56) References Cited

U.S. PATENT DOCUMENTS

| | | | |
|---|---|---|---|
| 6,478,974 | B1 | 11/2002 | Lebouitz et al. |
| 8,575,544 | B1 | 11/2013 | Kelly et al. |
| 8,703,591 | B2 | 4/2014 | Xia et al. |
| 8,704,167 | B2 | 4/2014 | Cooks et al. |
| 8,790,953 | B2 | 7/2014 | Fray et al. |
| 8,815,104 | B2 | 8/2014 | Toor et al. |
| 9,125,596 | B2 | 9/2015 | Leclerc et al. |
| 2004/0046288 | A1* | 3/2004 | Chou .................. G03F 7/0002 264/479 |
| 2008/0128608 | A1 | 6/2008 | Northen et al. |
| 2010/0056392 | A1 | 3/2010 | Greving et al. |
| 2010/0323917 | A1* | 12/2010 | Vertes ................ H01J 49/0418 506/12 |
| 2012/0225797 | A1 | 9/2012 | Northen et al. |
| 2013/0034690 | A1* | 2/2013 | Law .................... B81C 1/00206 428/141 |
| 2015/0056818 | A1 | 2/2015 | Levy et al. |
| 2015/0367380 | A1* | 12/2015 | Kotov ................... B42D 25/45 356/71 |
| 2017/0073743 | A1* | 3/2017 | Yu ......................... C12Q 1/6837 |
| 2018/0269052 | A1 | 9/2018 | Gao et al. |

OTHER PUBLICATIONS

Northen et al., Clathrate nanostructures for mass spectrometry, Nature. Oct. 25, 2007;449(7165):1033-6 (Year: 2007).*
Northen et al., Clathrate nanostructures for mass spectrometry, Nature. Oct. 25, 2007;449(7165):1033-6 Supplementary Information (Year: 2007).*
Haatainen et al. "Stamp fabrication by step and stamp nanoimprinting", VTT Publications 758(2011) (Year: 2011).*
Sainiemi et al. "Rapid fabrication of high aspect ratio silicon nanopillars for chemical analysis" 18 Nanotechnology (2007) (Year: 2007).*
Boer et al., "Guidelines for Etching Silicon MEMS Structures Using Fluorine High-Density Plasmas at Cryogenic Temperatures," Journal of Microelectromechanical Systems 2002, 11 (4), 385-401.
Cai et al., "Direct formation of self-assembled nanoporous aluminum oxide on SiO2 and Si substrates," Nanotechnology 2002, 13, 627-630.
Canham et al., "Silicon quantum wire array fabrication by electrochemical and chemical dissolution of wafers," Appl. Phys. Lett. 1990, 57(10), 1046-1048.
Choi et al., "Fabrication of SIC nanopillars by inductively coupled SF6/O2 plasma etching," J. Phys. D: Appl. Phys. 2012, 45, 1-9.
Cullis et al., "The structural and luminescence properties of porous silicon," Appl. Phys. Lett. 1997, 82 (3), 909-965.
Dussart et al., "Passivation mechanisms in cryogenic SF6/O2 etching process," J. Micromech. Microeng. 2004, 14, 190-196.
Ex parte Quayle dated May 23, 2019 in U.S. Appl. No. 15/899,923.
Gao et al., "Application of Black Silicon for nanostructure-Initiatir Mass Spectromy," Anal. Chem. 2016, 88, 1625-1630.
Gao et al., "Morphology-Driven Control of Metabolite Selectivity Using Nanostructure-Initiator Mass Spectrometry," Anal. Chem. 2017, 89, 6521-6526.
Goldstein et al., "Practical Scanning Electron Microscopy," Plenum Press, New York (1975).
Hook et al., "Patterned and switchable surfaces for biomolecular manipulation," Acta biomaterialia 2009, 5, 2350-2370.
International Preliminary Report on Patentability dated Apr. 10, 2018 in PCT Application No. PCT/US2016/055536.
International Search Report and Written Opinion dated Jan. 31, 2017 in PCT Application No. PCT/US2016/055536.
Jansen et al., "Black silicon method X: a review on high speed and selective plasma etching of silicon with profile control: an in-depth comparison between Bosch and cryostat DRIE processes as a roadmap to next generation equipment," J. Micromech. Microeng. 2009, 19, 1-41.
Jansen et al., "Black silicon method XI: oxygen pulses in SF6 plasma," J. Micromech. Microeng 2010, 20, 1-12.
Jansen et al., "The black silicon method: a universal method for determining the parameter setting of a fluorine based reactive ion etcher in deep silicon trench etching with profile control," J. Micromech. Microeng. 1995, 5, 115-120.
Jung et al., "Developments in Luminescent Porous Si," J. Electrochem. Soc. 1993, 140 (10), pp. 3046-3064.
Keita et al., "Dielectric functions of Si nanoparticles within a silicon nitride matrix" Phys. Status Solidi (c) 2010, 7 (2), 418-422.
Korotcenkov (ed.) "Porous Silicon: From Formation to Application. vol. 1: Formation and Properties," Taylor and Francis Group, CRC Press, Boca Raton, USA (2015), 432 pages.
Korotcenkov (ed.) "Porous Silicon: From Formation to Application. vol. 2: Biomedical and Sensor Applications," Taylor and Francis Group, CRC Press, Boca Raton, USA (2016), 424 pages.
Korotcenkov (ed.) "Porous Silicon: From Formation to Application. vol. 3: Microelectronics, Optoelectronics and Energy Technology Applications," Taylor and Francis Group, CRC Press, Boca Raton, USA (2016), 430 p.
Liu et al., "Nanoparticle layer deposition for highly controlled multilayer formation based on high-coverage monolayers of nanoparticles," Thin Solid Films 2016, 598, 16-24.
Northen et al. "Clathrate nanostructures for mass spectrometry," Nature, 2007, 449, 1033-1037.
Northen et al., "A nanostructure-initiator mass spectrometry-based enzyme activity assay," PNAS 2008, 105 (10), 3678-3683.
Northen et al., "High Surface Area of Porous Silicon Drives Desorption of Intact Molecules," J. Am. Soc. Mass Spectrom. 2007, 18, 1945-1949.
Office Action dated Nov. 9, 2018 in U.S. Appl. No. 15/899,923.
Properties of Porous Silicon (Canham ed., Institution of Electrical Engineers 1997).
Rübel et al., "OpenMSI: A High-Performance Web-Based Platform for Mass Spectrometry Imaging," Anal. Chem. 2013, 85, 10354-10361.
Sainiemi et al., "Rapid fabrication of high aspect ratio silicon nanopillars for chemical analysis," Nanotechnology 2007, 18 (50), 1-7.
Stolee et al., "Laser—nanostructure interactions for ion production," Phys. Chem. Chem. Phys. 2012, 14, 8453-8471.
Varghese et al., "Highly ordered nanoporous alumina films: Effect of pore size and uniformity on sensing performance," J. Mater. Res. 2002, 17 (5), 1162-1171.
Wells, O.C., "Scanning Electron Microscopy," McGraw Hill, New York, (1974).
Wongmanerod et al., "Determination of pore size distribution and surface area of thin porous silicon layers by spectroscopic ellipsometry," Applied Surface Science 2001, 172, 117-125.
Woo et al., "Nanostructure-initiator mass spectrometry: a protocol for preparing and applying NIMS surfaces for high-sensitivity mass analysis," Nature Protocols, 2008, 3 (8), 1341-1349.

* cited by examiner

FABRICATION OF MASS SPECTROMETRY SURFACE

RELATED APPLICATIONS

This application is the U.S. National Phase Under 35 U.S.C. § 371 of International Patent Application No. PCT/US2016/055536 entitled "FABRICATION OF MASS SPECTROMETRY SURFACE," filed on Oct. 5, 2016, which is based upon and claims priority to U.S. Provisional Patent Application No. 62/238,589, filed on Oct. 7, 2015 and U.S. Provisional Patent Application No. 62/286,084, filed on Jan. 22, 2016. The contents of these related applications are incorporated herein by reference in their entireties for all purposes.

STATEMENT REGARDING FEDERALLY SPONSORED R&D

This invention was made with government support under Contract No. DE-AC02-05CH11231 awarded by the U.S. Department of Energy and Grant No. HR0011514923 awarded by Defense Advanced Research Projects Agency (DARPA). The government has certain rights in the invention.

BACKGROUND

Field of the Invention

The present application relates generally to the fields of analyte analysis and detection. More specifically, the present application relates to compositions, methods and systems for analyzing and detecting analytes, for example biological or chemical molecules, as well as the methods suitable for making the composition and systems for analysis and detection.

Description of the Related Art

There is a demand for extremely sensitive and non-destructive analytical techniques, for use in a wide variety of fields including biological and chemical assays. Mass spectrometry is one widely-used analytical method, which relies on ionization of a target molecule. Matrix-assisted laser desorption/ionization mass spectrometry (MALDI), which relies on a traditional preparation method, is limited by the necessity of co-crystallization of the analyte in a matrix. In addition, MALDI sensitivity, especially for low molecular weight analytes, is often limited by background noise due to ionization of matrix molecules. More recently-developed methods including DIOS have shown some success, but are limited in analyte scope. Nanostructure initiator mass spectrometry (NIMS) is a highly sensitive detection method, which has low background of direct analyzing a wide range of samples, such as biofluids, tissues and single cells. However, wider implementation of NIMS has been limited by the electrochemical etching process for producing the nanostructured NIMS surface which involves the use of hazardous chemicals and electric current. There is a need for alternative methods for fabricating surfaces suitable for NIMS techniques.

SUMMARY

Some embodiments disclosed herein provide a composition for ionizing a target, comprising: a structured substrate having a plurality of microscale or nanoscale pillars; and an initiator, wherein at least two of the plurality of pillars are in contact with the initiator.

In some embodiments, the structured substrate comprises a semiconductor selected from the group consisting of Group IV semiconductors (e.g., diamond), Group I-VII semiconductors (e.g., CuF, CuCl, CuBr, CuI, AgBr, and AgI), Group II-VI semiconductors (e.g., BeO, BeS, BeSe, BeTe, BePo, MgTe, ZnO, ZnS, ZnSe, ZnTe, ZnPo, CdS, CdSe, CdTe, CdPo, HgS, HgSe, and HgTe), Group III-V semiconductors (e.g., BN, BP, BAs, AlN, AlP, AlAs, AlSb, GaN, GaP, GaSb, InN, InAs, InSb), sphaelerite structure semiconductors (e.g., MnS, MnSe, (3-SiC, $Ga_2Te_3$, $In_2Te_3$, $MgGeP_2$, $ZnSnP_2$, and $ZnSnAs_2$), Wurtzite Structure Compounds (e.g., NaS, MnSe, SiC, MnTe, $Al_2S_3$, and $Al_2Se_3$), I-II-VI2 semiconductors (e.g., $CuAlS_2$, $CuAlSe_2$, $CuAlTe_2$, $CuGaS_2$, $CuGaSe_2$, $CuGaTe_2$, $CuInS_2$, $CuInSe_2$, $CuInTe_2$, $CuTlS_2$, $CuTlSe_2$, $CuFeS_2$, $CuFeSe_2$, $CuLaS_2$, $AgAS_2$, $AgAlSe_2$, $AgAlTe_2$, $AgGaS_2$, $AgGaSe_2$, $AgGaTe_2$, $AgInS_2$, $AgInSe_2$, $AgInTe_2$, $AgFeS_2$), and silicon.

In some embodiments, the plurality of pillars comprises two or more semiconductor pillars. In some embodiments, the semiconductor is a p-type semiconductor. In some embodiments, the semiconductor is crystalline silicon. In some embodiments, the semiconductor has a <100> orientation.

In some embodiments, the average height of the plurality of pillars is about 50 nm to about 10 μm. In some embodiments, the average height of the plurality of pillars is about 100 nm to about 1 μm. In some embodiments, the height of the plurality of pillar ranges from about 50 nm to about 10 μm. In some embodiments, the height of the plurality of pillar ranges from about 100 nm to about 1 μm.

In some embodiments, the initiator is a fluorinated molecule. The initiator is selected from the group consisting of lauric acid, polysiloxanes, chlorosilanes, methoxy silanes, ethyoxy silanes, fluorous siloxanes and fluorous silanes. In some embodiments, the initiator is a polyfluorinated siloxane. In some embodiments, the initiator is bis(heptadecafluoro-1,1,2,2-tetrahydrodecyl)tetramethyldisiloxane. In some embodiments, the initiator is non-covalently attached to the structured substrate.

In some embodiments, the structured substrate is a black silicon substrate.

In some embodiments, the average aspect ratio of the plurality of pillars is about 1 to about 10. In some embodiments, the average aspect ratio of the plurality of pillars is about 1.2 to about 8.7. In some embodiments, the aspect ratio of the plurality of pillars ranges from about 1 to about 10. In some embodiments, the aspect ratio of the plurality of pillars ranges from about 1.2 to about 8.7.

In some embodiments, at least half of the plurality of nanoscale pillars are in contact with the initiator.

In some embodiments, the composition can include a target in contact with the initiator. In some embodiments, the target is a constituent of a sample selected from a biological sample, an environmental sample, a clinical sample, a forensic sample, or a combination thereof.

Some embodiments disclosed herein provides a method for ionizing a molecule, comprising: providing a structured semiconductor substrate having a plurality of microscale or nanoscale pillars; applying an initiator to the structured substrate, wherein at least two of the plurality of pillars are in contact with the initiator; delivering a target to the structured substrate that is in contact with the initiator to form a target-loaded substrate; and irradiating the target-loaded substrate.

In some embodiments, irradiating the target-loaded substrate comprises irradiating the target-loaded substrate with a laser, an ion beam, or any combination thereof.

In some embodiments, the structured substrate comprises a semiconductor selected from the group consisting of Group IV semiconductors (e.g., diamond), Group I-VII semiconductors (e.g., CuF, CuCl, CuBr, CuI, AgBr, and AgI), Group II-VI semiconductors (e.g., BeO, BeS, BeSe, BeTe, BePo, MgTe, ZnO, ZnS, ZnSe, ZnTe, ZnPo, CdS, CdSe, CdTe, CdPo, HgS, HgSe, and HgTe), Group III-V semiconductors (e.g., BN, BP, BAs, AlN, AlP, AlAs, AlSb, GaN, GaP, GaSb, InN, InAs, InSb), sphaelerite structure semiconductors (e.g., MnS, MnSe, (3-SiC, $Ga_2Te_3$, $In_2Te_3$, $MgGeP_2$, $ZnSnP_2$, and $ZnSnAs_2$), Wurtzite Structure Compounds (e.g., NaS, MnSe, SiC, MnTe, $Al_2S_3$, and $Al_2Se_3$), I-II-VI2 semiconductors (e.g., $CuAlS_2$, $CuAlSe_2$, $CuAlTe_2$, $CuGaS_2$, $CuGaSe_2$, $CuGaTe_2$, $CuInS_2$, $CuInSe_2$, $CuInTe_2$, $CuTlS_2$, $CuTlSe_2$, $CuFeS_2$, $CuFeSe_2$, $CuLaS_2$, $AgAS_2$, $AgAlSe_2$, $AgAlTe_2$, $AgGaS_2$, $AgGaSe_2$, $AgGaTe_2$, $AgInS_2$, $AgInSe_2$, $AgInTe_2$, $AgFeS_2$), and silicon.

In some embodiments, the structured semiconductor substrate comprises silicon. In some embodiments, the plurality of microscale or nanoscale pillars comprises two or more semiconductor pillars.

In some embodiments, the average height of the plurality of pillars is about 100 nm to about 1 μm. In some embodiments, the height of the plurality of pillars ranges from about 100 nm to about 1 μm.

In some embodiments, the initiator is a fluorinated molecule. In some embodiments, the initiator is selected from the group consisting of lauric acid, polysiloxanes, chlorosilanes, methoxy silanes, ethyoxy silanes, fluorous siloxanes and fluorous silanes. In some embodiments, the initiator is a polyfluorinated siloxane. In some embodiments, the initiator is bis(heptadecafluoro-1,1,2,2-tetrahydrodecyl)tetramethyldisiloxane.

In some embodiments, delivering a target to the structured substrate comprises contacting a sample comprising the target to the structured substrate. In some embodiments, the sample is a biological sample, an environmental sample, a clinical sample, a forensic sample, or a combination thereof. In some embodiments, the target is selected from the group consisting of lipids, amino acids, small molecules, peptides, drugs, proteins, and any combination thereof. In some embodiments, the sample comprises a tissue, cell, a biofluid, or a combination thereof.

In some embodiments, irradiating the target-loaded substrate comprises irradiating at a power selected to promote rearrangement of the structured substrate.

Some embodiments disclosed herein provides a method for making a composition for ionizing a target, comprising: providing a semiconductor material; etching the semiconductor material in the presence of an inductively coupled plasma to produce a structured semiconductor substrate, wherein the structured semiconductor substrate comprises a plurality of microscale or nanoscale pillars; and contacting the structured semiconductor substrate with an initiator, whereby at least two of the plurality of microscale or nanoscale pillars are in contact with the initiator.

In some embodiments, the inductively coupled plasma is a mixture selected from the group consisting of a mixture of $SF_6$ and $O_2$ gas and a mixture of $CF_4$ and $O_2$ gas. In some embodiments, etching the semiconductor comprises mixing $SF_6$ and $O_2$ at a $SF_6/O_2$ gas flow ratio of about 1 to about 11.5. In some embodiments, the flow rate of $SF_6$ is about 20 sccm to about 46 sccm. In some embodiments, the flow rate of $O_2$ is about 4 sccm to about 20 sccm.

In some embodiments, etching the semiconductor material lasts about 2 minutes to about 6.5 minutes. In some embodiments, etching time is selected to promote the selective ionization of a target. In some embodiments, etching time is selected to promote rearrangement of the structured semiconductor substrate. In some embodiments, the semiconductor material is etched at a temperature of about −80° C. to about −120° C. In some embodiments, the semiconductor material is etched at a temperature selected to promote the selective ionization of a target. In some embodiments, the semiconductor material is etched at a temperature selected to promote rearrangement of the structured semiconductor substrate.

DETAILED DESCRIPTION

Figure 1:
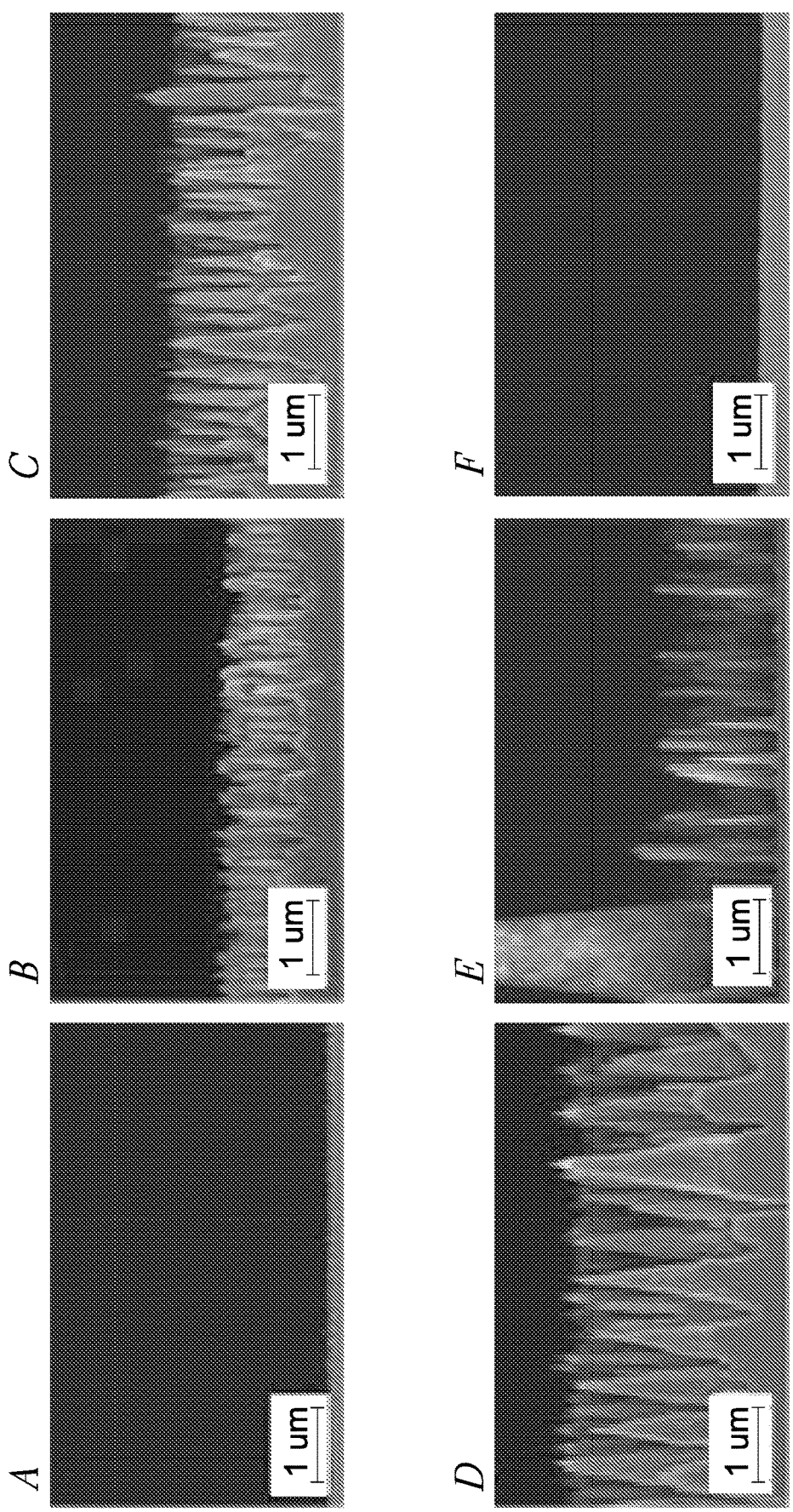
FIG. 1 shows SEM images with cross-sectional view of black silicon surfaces obtained at different $SF_6/O_2$ gas flow ratios: panel A, 20/20 sccm/sccm; panel B, 34/16 sccm/sccm; panel C, 38/12 sccm/sccm; panel D, 40/10 sccm/sccm; panel E, 42/8 sccm/sccm; and panel F, 46/4 sccm/sccm. All these wafers shown in FIG. 1 were etched for 5 min at −120° C.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Mass spectrometry using porous surfaces prepared by HF electrochemical etching was described in U.S. Patent Publication No. 2008/0128608, which is incorporated by reference herein in the entirety.

The materials and methods provided herein are not limited to any particular theory or mode of operation. For instance, there are many possible explanations for surface morphology dependent ionization efficiency, such as variance according to aspect ratios of surface pillars, melting point at the substrate surface, capillary action of the initiator along a surface, surface area, or laser absorption efficiency during a desorption/ionization process. The materials and methods provided herein are not intended to be construed to operate under a particular principle, but may be practiced by one of skill in the art according to technical knowledge and understanding at the time.

Selection of an appropriate size and aspect ratio of surface structures may be dependent on the desired use (e.g., desired target analytes to be detected and analyzed). in some embodiments when a surface pillar is too short, the pillars may not be deep enough to hold initiator efficiently resulting in poor mass spectrometry sensitivity. Meanwhile, in some embodiments, a too deep pillar structure may trap a target into a "pillar forest" resulting in low ionization efficiency. Further, a large surface area of a substrate may facilitate energy transfer from substrate to analyte under irradiation. Since in some embodiments the ionization methods provided herein depend in part on contact of an initiator to assist targets in desorbing from a surface, the amount of initiator trapped in the surface may impact ionization efficiency. The materials and methods provided herein are not intended to be limited to any particular mechanism or theory.

Definitions

Unless otherwise specifically noted herein, the terms set forth below will have the following definitions.

As used herein, the term "initiator" is used as understood by a person of skill in the art, and generally refers to a substance for promoting ionization of a target. Thus, an initiator is a substance other than the target and the substrate that improves ionization efficiency of a target. Generally the initiator is a fluid under the conditions chosen for ionization, for example a liquid. An initiator can have affinity for a structured surface as provided herein.

As used herein, the term "target" refers to any irradiation-ionizable molecule or compound.

As used herein, the term "substrate" refers to any composition of matter having a structured surface including a plurality of microscale or nanoscale surface structures such as pillars.

As used herein, the term "microscale" refers to objects or features that are amenable to measurement in microns, for example between about 1 micron and about 1000 microns.

As used herein, the term "nanoscale" refers to objects or features that are amenable to measurement in nanometers, for example between about 0.1 nanometer and about 1000 nanometers.

Materials and Surface Morphology

Disclosed here in some embodiments is a composition for ionizing a target. In some embodiments, the composition comprises a structured substrate with upright surface structures, and an initiator, wherein the initiator is in contact with at least a portion of the upright surface structures. In some embodiments, the upright surface structures are a plurality of pillars, and wherein at least two of the plurality of the pillars are in contact with the initiator. The pillars can be, for example, microscale or nanoscale. The structured substrate, in some embodiments, comprises a material on which the plurality of pillars is formed. The material may be any suitable for forming microscale or nanoscale structures, as such structures are provided herein. These materials should also generally be compatible with the methods disclosed herein, including target ionization under irradiation, and laser irradiation in particular.

In some embodiments provided herein, materials having structured surfaces are provided. In some embodiments, a material having a structured surface may be described as a substrate. In some embodiments, a structured surface as provided herein may include upright microscale or nanoscale structures. In some embodiments, a structured substrate as provided herein may include microscale or nanoscale pillars. In some embodiments the contemplated materials provided herein are initiator-loaded materials. In further embodiments, the contemplated materials provided herein are initiator-loaded substrates. In further embodiments, the materials provided herein are initiator-loaded semiconductor materials having a structured surface. In some embodiments, the initiator is in contact with at least two pillars.

A variety of materials can be used. In some embodiments, a material is a semiconductor material. As provided herein, a semiconductor material can include, but not limited to, SiC, GaP, $Si_xGe_x$, Ge, and GaAs, and InP Group IV semiconductors (e.g., diamond), Group I-VII semiconductors (e.g., CuF, CuCl, CuBr, CuI, AgBr, and AgI), Group II-VI semiconductors (e.g., BeO, BeS, BeSe, BeTe, BePo, MgTe, ZnO, ZnS, ZnSe, ZnTe, ZnPo, CdS, CdSe, CdTe, CdPo, HgS, HgSe, and HgTe), Group III-V semiconductors (e.g., BN, BP, BAs, AlN, AlP, AlAs, AlSb, GaN, GaP, GaSb, InN, InAs, InSb), sphaelerite structure semiconductors (e.g., MnS, MnSe, (3-SiC, $Ga_2Te_3$, $In_2Te_3$, $MgGeP_2$, $ZnSnP_2$, and $ZnSnAs_2$), Wurtzite Structure Compounds (e.g., NaS, MnSe, SiC, MnTe, $Al_2S_3$, and $Al_2Se_3$), and I-II-VI2 semiconductors (e.g., $CuAlS_2$, $CuAlSe_2$, $CuAlTe_2$, $CuGaS_2$, $CuGaSe_2$, $CuGaTe_2$, $CuInS_2$, $CuInSe_2$, $CuInTe_2$, $CuTlS_2$, $CuTlSe_2$, $CuFeS_2$, $CuFeSe_2$, $CuLaS_2$, $AgAS_2$, $AgAlSe_2$, $AgAlTe_2$, $AgGaS_2$, $AgGaSe_2$, $AgGaTe_2$, $AgInS_2$, $AgInSe_2$, $AgInTe_2$, $AgFeS_2$). Other conducting or semiconducting materials, such as metals and semimetals that are capable of transmitting energy to the initiator can also be used. In addition, other substrates, such as $Al_2O_3$, Which are capable of absorbing radiation, may also be used in the composition, methods or systems disclosed herein when they absorb energy and transmit it to the initiator. In embodiments that use ion-beam irradiation, the material can be a non-light-absorbing material.

In some embodiments, the semiconductor is an extrinsic, or "doped" semiconductor. A doped semiconductor may be a n-type semiconductor. Generally, a n-type semiconductor includes one or more donor atoms. Non-limiting examples of donor atoms include phosphorous, arsenic, antimony, selenium, tellurium, and germanium. The doped semiconductor may be a p-type semiconductor. Generally, a p-type semiconductor includes one or more acceptor atoms. Non-limiting examples of acceptor atoms include boron, aluminum, gallium, beryllium, zinc, and cadmium.

Some materials provided herein may exhibit crystal planes, also referred to as a surface orientation. The crystal plane may be expressed by the Miller index, for example, as <001> or (111). Such crystal planes may affect surface properties of the substrate, and the method or methods best suited to modify the surface of the material. A person of skill in the art will be able to choose a suitable surface corresponding to the crystal plane, and a suitable method of modifying the surface. In some embodiments, the substrate is crystalline silicon having <100> orientation. However, a structured substrate provided herein is not intended to be limited to a particular crystal plane.

In some embodiments, the semiconductor material may be crystalline silicon. In some embodiments, the material selected may be silicon having p-type doping and <100> orientation. In some embodiments, the material may include a silicon pillar. In still further embodiments, the silicon material may comprise a silicon wafer. The preparation of some silicon substrates has been described in, for example, Canham, Appl. Phys. Lett. 57, 1046 (1990); Cullis et al, Appl. Phys. Lett. 82, 909, 911-912 (1997); and Siuzdak, et al., U.S. Pat. No. 6,288,390, each of which is incorporated by reference herein in its entirety.

In some embodiments, the upright surface structures as provided herein are pillars. Pillars are raised areas on the surface of a material. In some embodiments, pillars may be characterized by an average height, which is measured from the average level of all, or a plurality, of the base of pillars on the substrate surface. In some embodiments, pillars may further be characterized by a full width at half height (FWHH), in which the width of a plurality of pillars is measured at one half height (in some embodiments, average height) of a plurality of pillars on the substrate surface. In some embodiments, the spacing between pillars may be measured by reference to the weighted geometric center of the cross-sectional area of a pillar at the substrate surface. As provided herein, pillars may exhibit a degree of irregularity, in spacing, in shape, and in size. Pillars may be irregular with respect to other pillars, or with respect to external indices such as paradigmatic shapes. In some embodiments, a plurality of pillars can be chosen for contact with a sample.

An upright surface structure such as a pillar may also be characterized by an aspect ratio. An aspect ratio for a population of pillars is generally determined by the average height of a plurality of pillars divided by the average width at the base of the plurality of pillars. If the pillars are generally conical, the aspect ratio may be calculated by dividing the average height of a plurality of pillars by the average diameter at the base of the pillars.

The size of the pillars can vary. For example, the average height of the plurality of pillars in the structured substrate can be, or be about, 1 nm, 10 nm, 50 nm, 100 nm, 250 nm, 500 nm, 800 nm, 1 µm, 2 µm, 3 µm, 4 µm, 5 µm, 6 µm, 7 µm, 8 µm, 9 µm, 10 µm, any value between any two of these values, or a range between any two of these values (including the end points). In some embodiments, the average height of a plurality of pillars is about 50 nm to about 10 µm; in some embodiments, the average height of a plurality of pillars is about 100 nm to about 5 µm; in some embodiments, the average height of a plurality of pillars is about 250 nm to about 1 µm.

As another example, the height of each pillar in the plurality of pillars in the structured substrate can be, or be about, 1 nm, 10 nm, 50 nm, 100 nm, 250 nm, 500 nm, 800 nm, 1 µm, 2 µm, 3 µm, 4 µm, 5 µm, 6 µm, 7 µm, 8 µm, 9 µm, 10 µm, or any value between any two of these values (including the end points). In some embodiments, the height of each pillar in the plurality of pillars ranges from about 50 nm to about 10 µm; in some embodiments, the height of each pillar in the plurality of pillars ranges from about 500 nm to about 5 µm; in some embodiments, the height of each pillar in the plurality of pillars ranges from about 100 nm to about 5 µm; in some embodiments, the height of each pillar in the plurality of pillars ranges from about 250 nm to about 1 µm.

The aspect ratio of the plurality of pillars can also vary. For example, the average aspect ratio of the plurality of pillars can be about 1 to about 10, about 1.5 to about 9.5, about 2 to about 9, about 2.5 to about 8.5, about 3 to about 8, about 3.5 to about 7.5, about 4 to about 7, about 4.5 to about 6.5, or any range in between. In some embodiments, the average aspect ratio of the plurality of pillars is about 1 to about 10; in some embodiments, the average aspect ratio of the plurality of pillars is about 1.2 to about 8.7; in some embodiments, the average aspect ratio of the plurality of pillars is about 2 to about 7; in some embodiments, the average aspect ratio of the plurality of pillars is about 3 to about 6; in some embodiments, the average aspect ratio of the plurality of pillars is about 4 to about 5; in some embodiments, the average aspect ratio of the plurality of pillars is about 1.2 to about 7; in some embodiments, the average aspect ratio of the plurality of pillars is about 1.2 to about 6; in some embodiments, the average aspect ratio of the plurality of pillars is about 1.2 to about 5; in some embodiments, the average aspect ratio of the plurality of pillars is about 3 to about 8.7; in some embodiments, the average aspect ratio of the plurality of pillars is about 4 to about 8.7.

As another example, the aspect ratio of each of the pillar in the plurality of pillars can be about 1 to about 10, about 1.5 to about 9.5, about 2 to about 9, about 2.5 to about 8.5, about 3 to about 8, about 3.5 to about 7.5, about 4 to about 7, about 4.5 to about 6.5, or any range in between. In some embodiments, the aspect ratio of each of the pillar in the plurality of pillars ranges from about 1.2 to about 8.7; in some embodiments, the aspect ratio of each of the pillar in the plurality of pillars is about 1.2 to about 8.7; in some embodiments, the aspect ratio of each of the pillar in the plurality of pillars is about 2 to about 7; in some embodiments, the aspect ratio of each of the pillar in the plurality of pillars is about 3 to about 6; in some embodiments, the aspect ratio of each of the pillar in the plurality of pillars is about 4 to about 5; in some embodiments, the aspect ratio of each of the pillar in the plurality of pillars is about 1.2 to about 7; in some embodiments, the aspect ratio of each of the pillar in the plurality of pillars is about 1.2 to about 6; in some embodiments, the aspect ratio of each of the pillar in the plurality of pillars is about 1.2 to about 5; in some embodiments, the aspect ratio of each of the pillar in the plurality of pillars is about 3 to about 8.7; in some embodiments, the aspect ratio of each of the pillar in the plurality of pillars is about 4 to about 8.7.

As provided herein, an upright surface structure such as a pillar may be described as a column, cone, shaft, post, upright, needle, peg, rod, peak, or mound. A space between two or more surface structures may be described as trenches, tunnels, valleys, nooks, excavations, or gaps. As provided herein, an upright surface structure such as a pillar may be irregular in shape, or may be cylindrical, pyramidal, or conical. In a cross section normal to the bulk surface of the substrate, an upright surface structure such as a pillar may be rectangular, trapezoidal, circular, or ellipsoid, among other suitable shapes. The shape of the upright surface structures may defy simple naming conventions for shapes. An upright surface structure may have the same shape as other upright surface structures on the same surface, or the upright surface structures may have different shapes from each other. An upright surface structure, or the shape thereof, may result from a single surface treatment step, from more than one surface treatment steps, or from no discrete surface treatment steps. In some embodiments, pillars are substantially conical in shape.

In some embodiments, the structured substrate can absorb electromagnetic radiation (for example, from a laser). In some embodiments a substrate, or a material having surface structures, can be a material that is compatible with ionization of a target by ion-beam irradiation.

Structured substrates as described herein may be obtained by any suitable method. Generally, the structures can be generated via any suitable chemical or physical method including etching, drilling, or scratching. In addition to the methods provided herein, such materials may be prepared by, for example, Reactive Ion Etching (for example, Jansen, H. V. et al., Journal of Micromechanics and Microengineering 2009, 19, 033001), Mazur's method (irradiating silicon with femtosecond laser pulses), metal nanoparticle deposition followed by oxidative solution etching (for example, U.S. Pat. No. 8,815,104), plasma immersion ion implantation (for example, U.S. Pat. No. 8,703,591), reduction of surface silica by molten salt electrolysis (for example, U.S. Pat. No. 8,790,953), or fluid oxidation (for example, U.S. Patent Application No. 2015/0056818). Other methods for preparing structured substrates include sintering of nanomaterials, lithographic preparations, sputtering, sol-gel preparation, and dip pen nanolithography, as well as other methods known to those of skill in the art. For example, U.S. Pat. Nos. 6,249,080 and 6,478,974, Cai et al., Nanotechnology 13:627, 2002 and Varghese et al., J. Mater. Res. 17:1162 1171, 2002, each of which is incorporated by reference herein in its entirety. A material's surface may also exhibit a morphology described herein without a separate surface treatment step.

A substrate, or surface structured material, provided herein may be characterized by its bulk characteristics, features or properties. A substrate may absorb energy from radiation. The reflectivity of a substrate may be in some embodiments under about 20 percent, in some embodiments may be less than about 10 percent, in some embodiments may be less than about 5 percent, in some embodiments may be less than about 2.5 percent, in some embodiments may be less than about 1 percent, in some embodiments may be less than about 0.5 percent, and in some embodiments in the range of about 0.3 to 2.5 percent. In some embodiments, the substrate may include a passivation layer. In some embodiments, the substrate may be black silicon.

Also disclosed herein are devices or systems (for example, spectrometers) comprising any of the surface structured materials disclosed herein. The type of the spectrometers can vary, for example, the spectrometer can be a mass spectrometer including but not limited to Matrix-assisted laser desorption/ionization mass spectrometry (MALDI) or Nanostructure initiator mass spectrometry (NIMS).

Initiators

Also provided herein are initiators useful for promoting ionization of a target. An initiator is a material other than the target that promotes or improves ionization efficiency or provides other benefit. Generally the initiator is a fluid, for example a liquid, which may be applied to a substrate (e.g., any of the substrate disclosed herein). Some initiator may remain in contact with the substrate after application to the substrate, even upon being blown with a jet of gas, for example, nitrogen. Furthermore, an initiator with affinity for a structured surface, as provided herein, should be chosen. In some embodiments, the initiator interacts with the substrate by non-covalent interactions. In some embodiments, an initiator is covalently or ionically bonded to a substrate. As provided herein, an initiator may be suited to a certain structured surface, to a class of structured surfaces, to a certain semiconductor material of substrate, or for ionization of a selected target.

An initiator that is transparent to UV light can be suitable for the methods, composition and system disclosed herein. In some preferred embodiments, the initiator does not ionize under the conditions used to ionize the target. Also preferably, the initiator does not covalently interact with target molecules.

Without intending to be limited by any particular theory, it is thought that the substrate absorbs energy upon irradiation and transfers the absorbed energy through the initiator to the target. The transfer of energy, it is thought, promotes desorption and ionization of the target.

For example, the sensitivity of a mass spectrometry measurement was surprisingly increased several fold when an initiator was used compared to when no initiator was used. See FIG. 12A (no initiator) vs FIG. 12B (BisF17 initiator was applied).

In some embodiments, an initiator is a composition comprising, or is, a fluorinated molecule. In some embodiments, an initiator is a composition comprising, or is, a perfluorinated molecule. In some embodiments, the initiator is a composition comprising, or is, a polyfluorinated siloxane. In some embodiments, the initiator is a composition comprising, or is, a polyfluorinated silane. In some embodiments, the initiator is a composition comprising, or is, bis(heptadecafluoro-1,1,2,2-tetrahydrodecyl)tetramethyldisoxane ("BisF17").

In some embodiments, the initiator is a composition comprising, or is, (heptadecafluoro-1,1,2,2-tetrahydrodecyl)dimethylchlorosilane, bis(tridecafluoro-1,1,2,2-tetrahydrooctyl)tetramethyldisiloxane; bis(tridecafluoro-1,1,2,2tetrahydrooctyldimethylsiloxy)-methylchlorosilane, poly(3,3,3-trifluoropropylmethylsiloxane), or any combination thereof. In some embodiments, the initiator is a composition comprising, or is chlorosilanes, chlorosiloxanes, or a combination thereof. In addition, structured substrates can also be treated with other kinds of aliphatic molecules, such as siloxanes, fatty acids, waxes, or a combination thereof. In some embodiments, the initiator is a composition comprising, or is, lauric acid, polysiloxanes, chlorosilanes, methoxy silanes, ethyoxy silanes, fluorous siloxanes, fluorous silanes, or a combination thereof. The initiator can be a single compound or a mixture of compounds.

In some embodiments, an initiator can comprise a compound:

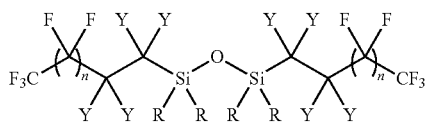

where each n is independently an integer between 4 and 20, an integer between 8 and 15, or an integer between 10 and 14; where each R is independently selected from $CH_3$, Cl, and $OCH_3$; and where each Y is independently selected from H and F.

Some embodiments provided herein include compositions comprising a structured substrate having a plurality of microscale or nanoscale pillars; and an initiator, wherein at least two of the plurality of pillars are in contact with the initiator. Non-limiting examples of the contact between initiator and surface in embodiments provided herein may be described as adsorption, absorption, dissolution, adhesion or wetting.

In some embodiments, a target molecule is in contact with the initiator. In some embodiments, the target may interact weakly with the initiator such that the initiator and the target form separate phases. In some embodiments, an initiator in contact with a substrate is not in a crystalline form. In further embodiments, an initiator is not a crystal.

Target

The targets suitable to be ionized by the compositions, methods and systems disclosed herein can vary. For example, the target may be of any class of ionizable molecules including, but not limited to, a small molecule, a metabolite, a biomolecule, a cell, a protein, a lysate, a lipid, an amino acid, a nucleic acid, a carbohydrate, a chemical compound, a peptide, a drug, or any combination thereof. Target molecules of any suitable mass may be chosen. For example, the target may have a molecular weight in the range of 100 to 1000 g/mole, or may have a molecular weight on the scale of about 100 Da, about 1 kDa, about 10 kDa, or about 100 kDa. In some embodiments, one target may be ionized. In further embodiments, more than one target may be ionized. In further embodiments, a target molecule can be selectively ionized. In still further embodiments, a selectively ionized molecule can be a small molecule, a metabolite, a biomolecule, a cell, a protein, a lysate, a lipid, an amino acid, a nucleic acid, a carbohydrate, a chemical compound, a peptide, a drug, or any combination thereof.

In some embodiments, the target can be tagged, for example, fluorous tagged as described in, for example, Northen et al, "A nanostructure-initiator mass spectrometry-based enzyme activity assay" (2008), PNAS 105 (10) 3678-3683, which is incorporated by reference herein in the entirety.

In some embodiments, a target or targets, with or without accompanying additional materials, can be introduced to the substrate. A target can be present in a composition (e.g., a sample) with one or more additional components. Additional components can include, but are not limited to, buffers, metabolites, carriers, solvent, or any other suitable substance. The composition containing the target can be, for example, a biological sample, a clinical sample, an environmental sample, an industrial sample, a forensic sample, or a combination thereof. In some embodiments, the composition comprises a tissue, a cell, a biofluid, or a combination thereof. In some embodiments, a target present as a constituent of a biological sample can be ionized selectively. In further embodiments, a metabolite, a biomolecule, a cell, a protein, a lysate, a lipid, an amino acid, a nucleic acid, a carbohydrate, a chemical compound, a peptide, a drug, or any combination thereof present as a constituent of a biological sample can be ionized selectively.

Any application method that permits the target(s) to reach the surface of the substrate can be used. Such methods include delivery via an aliquot of solution, direct mechanical placement of solid target(s), and evaporation/condensation or sublimation/deposition of the target(s) onto the substrate. Such introduction can result in physical contact with the substrate, including adsorption or absorption. Introducing a target, by any means, to a substrate yields a "target-loaded substrate." For example, the target may be introduced in amounts of about 500 ymol to about 100 nmol of target, although appropriate quantities of target in a sample for a particular application will be apparent to one of skill in the art. A target being ionized to perform analysis (e.g. mass spectrometry) may be called an analyte. The materials and methods provided herein are compatible with a single target, or a plurality of targets in a single experiment. A plurality of targets may be present together in a sample mixture, or may be in distinct loci on the substrate, or may be a combination of these. In some embodiments, a target is not trapped in a crystal matrix.

Methods for Ionizing Targets

Also disclosed herein are methods of ionizing one or more targets, and methods of using the compositions for ionizing a target that are disclosed herein to detect and/or analyze one or more target analytes.

Figure 16:
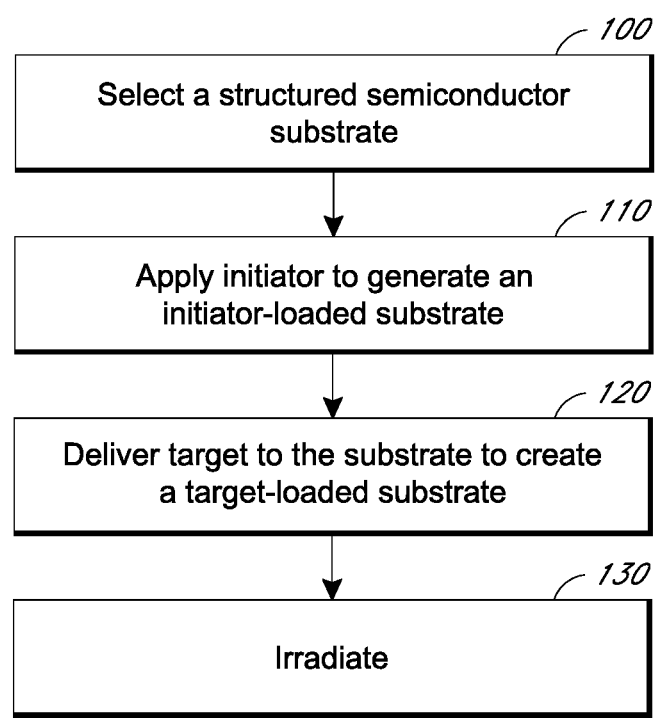
FIG. 16 is a schematic diagram illustrating a non-limiting embodiment of a method of ionizing a molecule.

An illustrative and non-limiting embodiment of the methods of ionizing a target(s) is depicted in FIG. 16. Beginning at block 100 (Select a structured semiconductor substrate), a substrate is provided. The substrate may be any suitable substrate, including a structured semiconductor substrate described herein. For example, the structured semiconductor substrate may be a silicon substrate having microscale or nanoscale pillars.

The substrate selected may be made of any suitable material as provided herein. In some embodiments, the substrate selected may be a structured semiconductor substrate. In further embodiments, the substrate selected may be a structured silicon substrate. In further embodiments, the substrate selected may be a structured semiconductor substrate having a plurality of microscale or nanoscale pillars. In further embodiments, the substrate selected may be a structured semiconductor substrate having a plurality of microscale pillars. In further embodiments, the substrate selected may be a structured semiconductor substrate having a plurality of nanoscale pillars.

The substrate selected may be based on the particular application intended. The substrate may be selected to promote desorption or ionization of a target, to inhibit desorption or ionization of a molecule other than a target, or a combination of these. Although many combinations of target and substrate are possible, one of skill in the art will be able to select an appropriate substrate based on the guidance herein and on other knowledge available to such persons.

At block 110 (Apply initiator to generate an initiator-loaded substrate), the initiator is applied to the substrate. Any suitable method that results in contact between the initiator and the substrate may be used. For example, the initiator may be applied by soaking, dropping, dipping, spraying, printing, deposition, or condensation. In some embodiments, the initiator may be applied in combination with a carrier, for example a solvent. In such embodiments, the carrier may be removed by a suitable method such as blowing with gas or evaporation. In some embodiments, the initiator may be affixed to the substrate by a chemical reaction forming a covalent or ionic bond. In some embodiments, the interaction between the substrate and the initiator may be reversible. In general, a target can be applied to a substrate before, during, or after the time when an initiator is applied to the substrate.

At block 120 (Deliver target to the substrate to create a target-loaded substrate), the sample is delivered to the substrate. A sample includes one or more targets. Any suitable method that results in contact between a target and the substrate may be used. For example, the sample may be applied by dropping, dipping, spraying, printing, deposition, or condensation. In some embodiments, the sample may be applied by an acoustic printer.

A suitable amount of target(s) deposited onto the substrate may vary, for example, from about 10 pmol to about 100 fmol, or from about 500 ymol to about 100 nmol, although other amounts may be appropriate depending on the application. In some embodiments, the amount of sample applied to the substrate should be chosen to provide the desired amount of a target.

In some embodiments, the target may be applied in combination with other substances. The target may be applied concurrent with a carrier, for example, a solvent. The target may be adsorbed, dissolved, or suspended in the carrier. In some embodiments, the sample may be dissolved or suspended in a mixture of methanol and water. In some embodiments, the methanol:water ratio may be about 1:1 by volume to about 1:9 by volume. In some embodiments, formic acid may be added, for example, in about 0.01% to about 1% of solvent volume, about 0.05% to about 0.5%, or about 0.1% of solvent volume. In some embodiments, the carrier may be removed by a suitable method such as blowing or evaporation. A sample containing the target may be applied in any suitable amount, for example, about 1 nL, about 5 nL, about 10 nL, about 50 nL, or about 100 nL. The sample may also include additional substances such as buffers, sterilizing agents, stabilizing agents, and the like. In some embodiments, the sample may be an unpurified mixture from a biological source, for example, tissues, or blood or other fluid drawn from a subject.

In some embodiments, a plurality of samples may be applied to a substrate. In some embodiments, a single sample may be applied to a substrate in more than one locus. In some embodiments, a sample may be applied to the substrate such that loci on the substrate are correlated with loci in the sample. For example, a slice of a tissue may be applied to a substrate. In such embodiments, the irradiation of a certain locus on the substrate may ionize different targets, or different amounts of a target, than another locus on the same substrate.

At block 130 (Irradiate), the prepared composition of substrate, initiator, and target(s) is irradiated. The irradiation may be by any suitable method. For example, the irradiation may be by laser or by ion beam.

In some embodiments, the laser source can be an ultraviolet pulse laser. In some embodiments, 50 to about 500 laser shots from a 337 nm pulsed nitrogen laser (Laser Science, Inc.) with a power of 2 to 50 µJ/pulse can be used. Irradiation can be done with a lens, and with an optional neutral density filter; these and other methods of focusing and filtering laser radiation being known to those skilled in the art. A preferred ion beam can be composed of positively charged clustered ions. In some embodiments, a cluster source, such as $Bi^{3+}$ ion source, can be used. Alternatively, other monoatomic and clustered ions can be used such as $Au^+$, $Ga^+$, and $Bi^+$.

The irradiation may be at any appropriate intensity and duration to promote desorption and ionization of a target. Generally, the intensity of irradiation should be selected so as to lead to substrate surface reorganization. In some embodiments, a single laser pulse or ion beam pulse may be used. In some embodiments, more than one laser pulses or ion beam pulses may be used. Although many variations are possible, one of skill in the art will be able to select an appropriate irradiation method based on the guidance herein and on other knowledge available to such persons.

The pressure during target desorption can vary substantially depending on the sensitivity desired. In some embodiments, the pressure is a pressure at which MALDI-MS can operate. In some embodiments, the pressure is a pressure at which atmospheric MALDI (AP-MALDI) is typically performed. In some embodiments, lower pressures can be used to improve sensitivity and lessen interference problems. In some embodiments, the pressure can be $10^{-6}$ to $10^{-7}$ torr. In some embodiments, higher reduced pressures can be used, up to atmospheric pressure.

In some embodiments, the mass-to-charge ratio of the ionized target may be determined. A variety of apparatuses may be used to measure the mass-to-charge ratio of the ionized target. In some embodiments, a time-of-flight mass analyzer may be used for detecting the desorbed and ionized target. When employed in the methods provided herein, the time-of-flight mass analyzer may be preceded by an ion reflector to correct for kinetic energy differences among ions of the same mass. In some embodiments, a brief delay between the desorption-ionization of the target and the application of the initial accelerating voltage by the mass analyzer may be allowed. In some embodiments, other mass analyzers, including magnetic ion cyclotron resonance instruments, deflection instruments, quadrupole mass analyzers, or other instruments known to one skilled in the art may be used.

In some embodiments, a commercial mass spectrometry system may be used, for example, an AB Sciex TOF/TOF 5800 MALDI mass spectrometry system. In some embodiments, positive ionization mode may be used. In some embodiments, negative ionization mode may be used. Post-collection processing may be employed, for example, MALDI MSI 4800 imaging software.

In some embodiments, a sample or samples may be applied to the substrate in more than one locus. In some embodiments, the locus or loci of a sample as applied to a substrate may be detected. In some embodiments, the irradiation may be focused at a particular area of the substrate, leading to ionization of a target or targets in a particular area of the substrate. One of skill in the art will appreciate that such localized ionization may be useful in determining the locus of a target, and thus a sample or part of a sample, on the substrate. In some embodiments, the location of a target can be correlated with its location in a sample, for example, a tissue, a forensic sample, an industrial sample, or an environmental sample.

It will be appreciated by one of skill in the art that the order in which the initiator is applied (block 110) and the sample is delivered (block 120) is not particularly limited. These steps may occur concurrently or sequentially, and any order is within the scope of the present disclosure. In some embodiments, the initiator may be applied before the sample is delivered. In some embodiments, the sample may be delivered before the initiator is applied.

Methods for Making Structured Substrates

Also disclosed herein are methods of preparing compositions suitable for ionizing targets. In some embodiments, the method comprises: providing a semiconductor material; etching the semiconductor material in the presence of an inductively coupled plasma to produce a structured semiconductor substrate, wherein the structured semiconductor substrate comprises a plurality of upright surface structures; and contacting the structured semiconductor substrate with an initiator, thereby at least two of the plurality of upright surface structures are in contact with the initiator. In some embodiments, the upright surface structures comprise, or are, microscale or nanoscale pillars.

Figure 17:
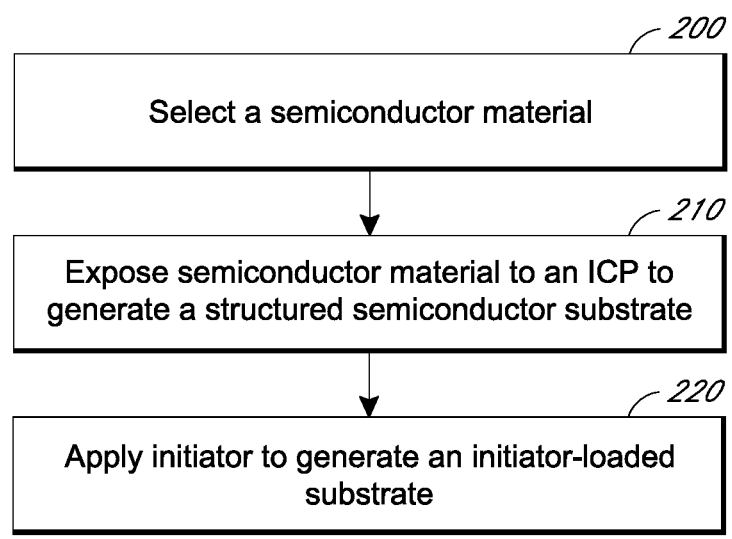
FIG. 17 is a schematic diagram illustrating a non-limiting embodiment of a method of making a composition for ionizing a target.

An illustrative and non-limiting embodiment of the methods disclosed herein is depicted in FIG. 17. Beginning at block 200 (Select a semiconductor material), a material is selected. The material selected may be any suitable material, including a semiconductor material described herein. In some embodiments, the material selected is crystalline silicon. In some embodiments, the material selected may be silicon having p-type doping and <100> orientation.

At block 210 (Expose semiconductor material to an ICP to generate a structured semiconductor substrate), the material is exposed to an ICP. The method of exposure may be any method that results in a structured semiconductor substrate as provided herein. In some embodiments, the exposure may result in black silicon.

The method of exposure may be chosen so as to result in a structured substrate that promotes desorption and ionization of a target. The method of exposure may be chosen so as to result in a structured substrate that provides efficient energy transfer from substrate to target. The method of exposure may be chosen so as to result in a structured substrate that undergoes surface restructuring upon laser irradiation.

One of skill in the art will have the knowledge to choose an appropriate method. An appropriate method will result in upright surface structures, such as microscale or nanoscale pillars, as provided herein. One of skill in the art will appreciate that methods are known for performing ICP that may be used to generate structured-surface semiconductors as provided herein. In addition to methods provided herein, persons of skill in the art have at their disposal knowledge needed to carry out such methods, for example, those found in following references, each of which is incorporated by reference herein in the entirety: Jansen, H.; Boer, M. d.; Legtenberg, R.; Elwenspoek, M. *Journal of Micromechanics and Microengineering* 1995, 5, 115; Jansen, H. V.; Boer, M. J. d.; Unnikrishnan, S.; Louwerse, M. C.; Elwenspoek, M. C. *Journal of Micromechanics and Microengineering* 2009, 19, 033001; Dussart, R.; Boufnichel, M.; Marcos, G.; Lefaucheux, P.; Basillais, A.; Benoit, R.; Tillocher, T.; Mellhaoui, X.; Estrade-Szwarckopf, H.; Ranson, P. *Journal of Micromechanics and Microengineering* 2004, 14, 190. In some embodiments, an ICP-Reactive Ion Etching ("ICP-RIE") process at cryogenic temperatures is used.

One of skill in the art can choose appropriate plasma generation conditions according to the person's desired use. In some embodiments, the power can be fixed at 5 W for the etching chamber and 1000 W for the plasma generator chamber. In some embodiments, a mixture of $SF_6$ and $O_2$ gas may be used. In some embodiments, a mixture of $CF_4$ and $O_2$ gas may be used. An appropriate chamber pressure should be selected, for example, 6 mTorr chamber pressure may be used.

The flow rates of constituent gases to form the ICP may be varied to provide the desired surface morphology, for example, by affecting height and aspect ratio of pillars. The ratio of $SF_6/O_2$ in the ICP gas may partly determine the morphology of the substrate surface, along with other factors. As a non-limiting example, $SF_6/O_2$ gas flow ratios may be varied from 1:1 to 11.5:1 by adjusting $SF_6$ flow rate from 20 sccm to 46 sccm and $O_2$ from 20 sccm to 4 sccm. In some embodiments, $SF_6/O_2$ gas flow ratios can be, or be about, 0.5:1, 1:1, 2:1, 3:1, 4:1, 5:1, 6:1, 7:1, 8:1, 9:1, 10:1, 11:1, 11.5:1, 12:1, 13:1, 14:1, 15:1, 16:1, or a range between any two of these values.

The exposure time of the substrate to the ICP can be varied to provide the desired surface morphology. For example, exposure time may be, or be about, 0.5 minute, 1 minute, 2 minutes, 3 minutes, 4 minutes, 5 minutes, 6 minutes, 7 minutes, 8 minutes, 9 minutes, 10 minutes, 20 minutes, or a range between any two of these values.

The exposure temperature of the substrate in the ICP can also be varied to provide the desired surface morphology. For example, in some embodiments, higher temperature may be correlated with more homogeneous and thinner pillars. In some embodiments, the exposure temperature may be, or be about, −60° C., −70° C., −80° C., −90° C., −100° C., −110° C., −120° C., −130° C., −140° C., −150° C., −160° C., or a range between any two of these values.

Any suitable instrument for forming the plasma may be used. In some embodiments, an Oxford Instrument Plasma-Lab 100, or other suitable instrument, may be used.

At block 220 (Apply initiator to generate an initiator-loaded substrate), the initiator is applied to the substrate. Any suitable method, for example, those methods provided herein, that results in contact between the initiator and the substrate may be used.

EXAMPLE

Additional embodiments are disclosed in further detail in the following examples, which are not in any way intended to limit the scope of the claims.

Example 1

Preparation of Substrate

Fabrication of Substrates.

This example illustrates a non-limiting process whereby a substrate can be prepared in a manner suitable to allow ionization by irradiation. A silicon wafer (4", p-type doping, 525±25 μm thickness, <100> orientation, 0.01-0.02 Ω·cm, purchased from Addison Engineering) was etched by the ICP-RIE process (Oxford Instrument PlasmaLab 100) at cryogenic temperatures. The power was fixed at 5 W for the etching chamber and 1000 W for the plasma generator chamber. A mixture of $SF_6$ and $O_2$ gas at 6 mTorr chamber pressure was used. The substrate was soaked with the initiator bis(heptadecafluoro-1,1,2,2-tetrahydrodecyl)tetramethyldisiloxane (BisF17) for 40 minutes, and then excess initiator was blown off with nitrogen. It was found that the initiator could be desorbed from the surface to form a surface film. When the substrate treated with initiator was heated, the substrate took on a wet appearance, indicating that the initiator was reversibly absorbed into the substrate.

Sample Preparation.

Spermidine, arginine, adenosine, pamiltoylcarnitine, verapamil, streptomycin, STAL-2 (hexapeptide, SFLLRN-$NH_2$), and bradykinin were purchased from Sigma-Aldrich with high purity grade. A chemical library with 118 secondary metabolites was obtained from Enzo Life Sciences. All compounds were of high purity grade and their concentration is included in the discussion session. Bradykinin is from a peptide mass standard kit that was purchased from AnaSpec. It is a pre-mixed sample and the concentration used in this study is fixed. Methanol (J. T. Baker, LC-MS grade) and water (J. T. Baker, LC-MS grade) are mixed together following 1:1 volume ratio (1:9 volume ratio for the limit of detection experiment) as solvent with the additive of 0.1% formic acid (Sigma-Aldrich, MS grade).

Sample Loading.

Samples were spotted onto NIMS chips using an acoustic printer (EDC ATS-100) with 10 nL deposition volume.

NIMS Measurements.

An AB Sciex TOF/TOF 5800 MALDI mass spectrometry system combined with MALDI MSI 4800 imaging software was used for NIMS mass spectrum collection and imaging, and this system was configured for the measurements at positive ionization mode. The acquired data was analyzed using the OpenMSI program. Protocols for mass spectrometry were as described previously (see, for example, Northen et al., "Clathrate Nanostructures for Mass Spectrometry," Nature (2007) 449, 1033-1036; Woo et al., "Nanostructure-Initiator Mass Spectrometry (NIMS): A protocol for preparing and applying NIMS surfaces for high sensitivity mass analysis," Nature Protocols (2008) 3, 1341-1349), each of which is incorporated by reference herein in the entirety.

Scanning Electron Microscopy (SEM).

Semiconductor substrate surfaces were analyzed using SEM. Methods of using the SEM technique are available to the person of ordinary skill in the art and described in, for example, Goldstein, J. et al, "Practical Scanning Electron Microscopy," Plenum Press, New York (1975); Wells, O. C., "Scanning Electron Microscopy," McGraw Hill, N.Y., (1974).

One of ordinary skill in the art will appreciate that these are only examples and that many other procedures and materials may be utilized without departing from the scope of the disclosure.

Example 2

Varying Morphology of Substrate Surfaces

This example illustrates a non-limiting procedure whereby the morphology of the semiconductor substrate can be varied to suit a particular application. An ICP etching was chosen. Varying plasma gas composition, temperature, and exposure time provided substrates with tunable surface morphology.

Effect of $SF_6/O_2$ ICP Gas Flow Rates on Surface Morphology.

In some embodiments, substrates were treated with varying gas flow rates while keeping a fixed etching time. The $SF_6/O_2$ gas flow ratios were varied from 1/1 to 11.5/1 by adjusting $SF_6$ flow rate from 20 sccm to 46 sccm and $O_2$ from 20 sccm to 8 sccm. FIG. 1 shows SEM images of cross-sectional views of these semiconductor substrates. The ratio of $SF_6/O_2$ in the ICP gas determined the morphology of the substrate surface. As shown in FIG. 1, surface features are not formed when $O_2$ flow rate is above 20 sccm or below 4 sccm. FIG. 1 panel A shows the surface microstructures grow slowly at $SF_6/O_2$ 20/20 sccm/sccm flow rates due to limited etching rate caused by this low $SF_6$ content. Upright structures, here with a conical shape, are observed in SEM images of samples etched at 34/16 to 42/8 sccm/sccm of $SF_6/O_2$ gas flow rates (FIG. 1). Their dimensions vary with the $SF_6/O_2$ ratio, and their heights in this example are 1 μm up to 10 μm. The typical silicon pillar structures with triangular sloped surface are clearly observed from samples etched at 34/16 to 42/8 sccm/sccm of $SF_6/O_2$ gas flow rates (FIG. 1 panels B-E). This morphology is dramatically different comparing with the electrochemically etched surface.

These nanostructured surfaces trapped the initiator. Specifically, excess initiator was removed using a jet of nitrogen. This resulted in surfaces without visible initiator surface film. As found with electrochemically etched surfaces, reversible migration of the initiator out of the surface with slight heating and cooling and enhancement of analyte detection with the presence of the initiator were observed. Many new morphologies can be obtained using this approach.

Figure 2:
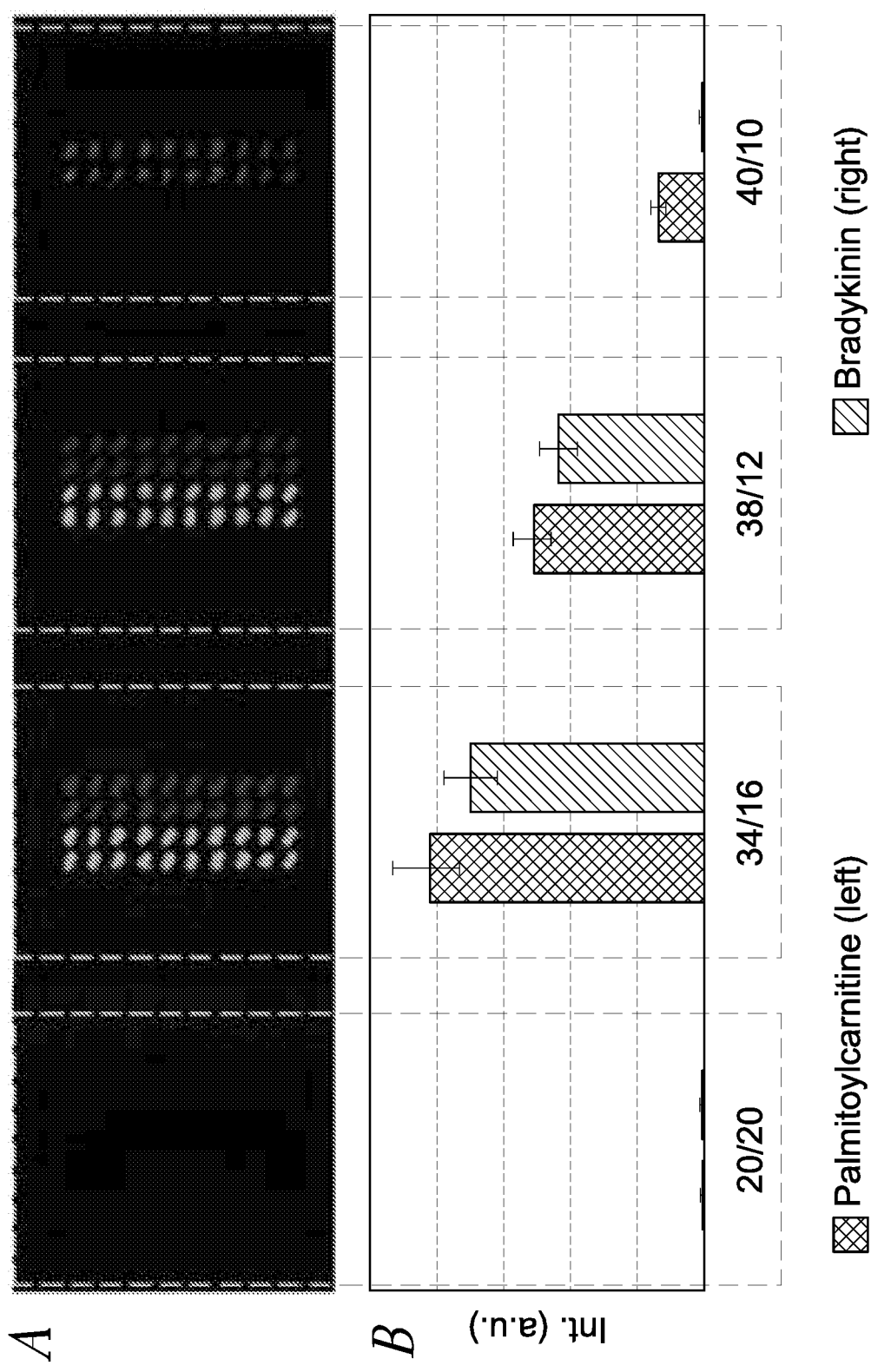
FIG. 2 depicts sensitivity comparison of NIMS substrates prepared with black silicon obtained at different $SF_6/O_2$ flow rates using mass spectrometry imaging. Palmitoylcarnitine (25 μM, left, m/z 400.34+/−0.01 Da) and bradykinin (right, m/z 905.05+/−0.01 Da) samples were used here by acoustic printing technique. Panel A shows the direct NIMS imaging results of analyte sample spots on these black silicon substrates. Panel B shows averaged signal intensities and standard deviations of the image in Panel 2A (n=20).

Imaging mass is used to compare NIMS activities for molecules acoustically printed on the NIMS surface resulting in false color images showing the intensity of the molecules (FIG. 2 panel A). Using this approach for comparison of NIMS sensitivity, black silicon NIMS substrates prepared with SF$_6$/O$_2$ gas flow rates of 20/20, 34/16, 38/12, 40/10 sccm/sccm show a wide range of activities (FIG. 2). The black silicon substrate fabricated at SF$_6$/O$_2$ 34/16 sccm/sccm flow rate shows the highest NIMS sensitivity while the black silicon substrate obtained at SF$_6$/O$_2$ 20/20 sccm/sccm flow rate appears the lowest NIMS sensitivity for both palmitoylcarnitine and bradykinin samples.

To compare NIMS sensitivity of substrates prepared using varied gas flow rates, pamiltoylcarnitine and bradykinin were applied to substrate surfaces prepared at 20/20, 34/16, 38/12, and 40/10 SF$_6$/O$_2$. The substrate fabricated at SF$_6$/O$_2$ 34/16 sccm/sccm flow rate showed the highest NIMS sensitivity, while the substrate obtained at SF$_6$/O$_2$ 20/20 sccm/sccm flow rate provided the lowest NIMS sensitivity for both pamiltoylcarnitine and bradykinin (FIG. 2). These results collectively show that surface parameters controlled by the method of sample preparation partly determine the sensitivity of mass spectrometry detection of analytes.

Effect of Exposure Time on Surface Morphology.

Figure 3:
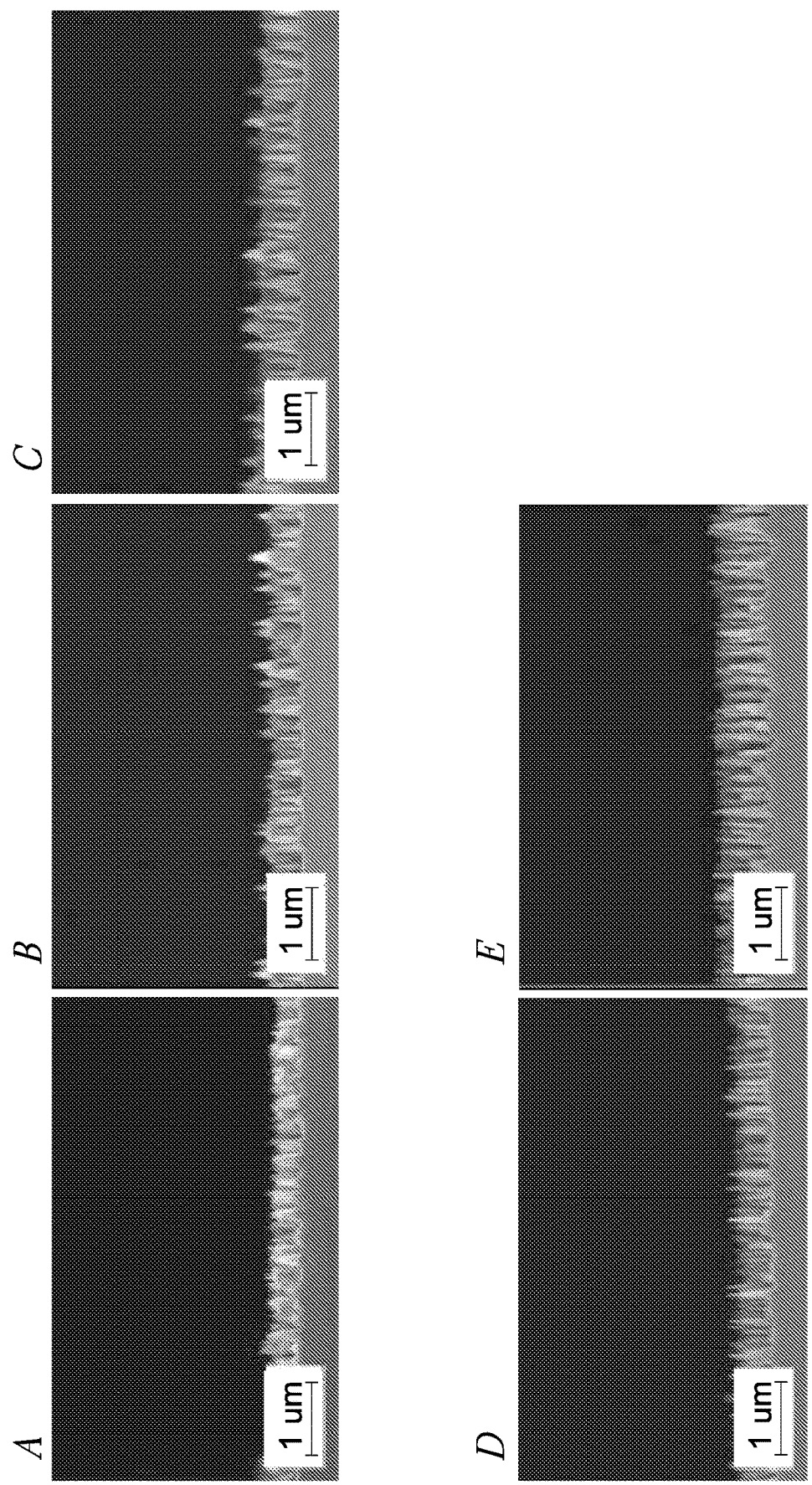
FIG. 3 shows SEM images with cross-sectional view of black silicon surfaces obtained at different etching times: panel A, 2 minutes; panel B, 2.5 minutes; panel C, 3 minutes; panel D, 3.5 minutes; and panel E, 5 minutes. All these wafers shown in FIG. 3 were etched at −120° C. with constant $SF_6/O_2$ gas flow rate of 36/14 sccm/sccm.

Exposure time to ICP was evaluated for its effect on surface morphology. The gas flow rate was fixed at SF$_6$/O$_2$ 34/16 sccm/sccm since substrates generated at this flow rate showed higher NIMS sensitivity comparing with other ICP gas flow rates used to prepare samples, as seen in FIG. 2. Exposure time was varied from 2 min to 6.5 min. FIG. 3 shows the SEM images with cross-section views of substrates so prepared. The height of structures is increased from 250 nm to 700 nm when etching time is increased from 2 min to 5 min. It was also observed that surface structures appeared more homogeneous and thinner with longer etching time; aspect ratios increased from 1.2 to 4.

Figure 4:
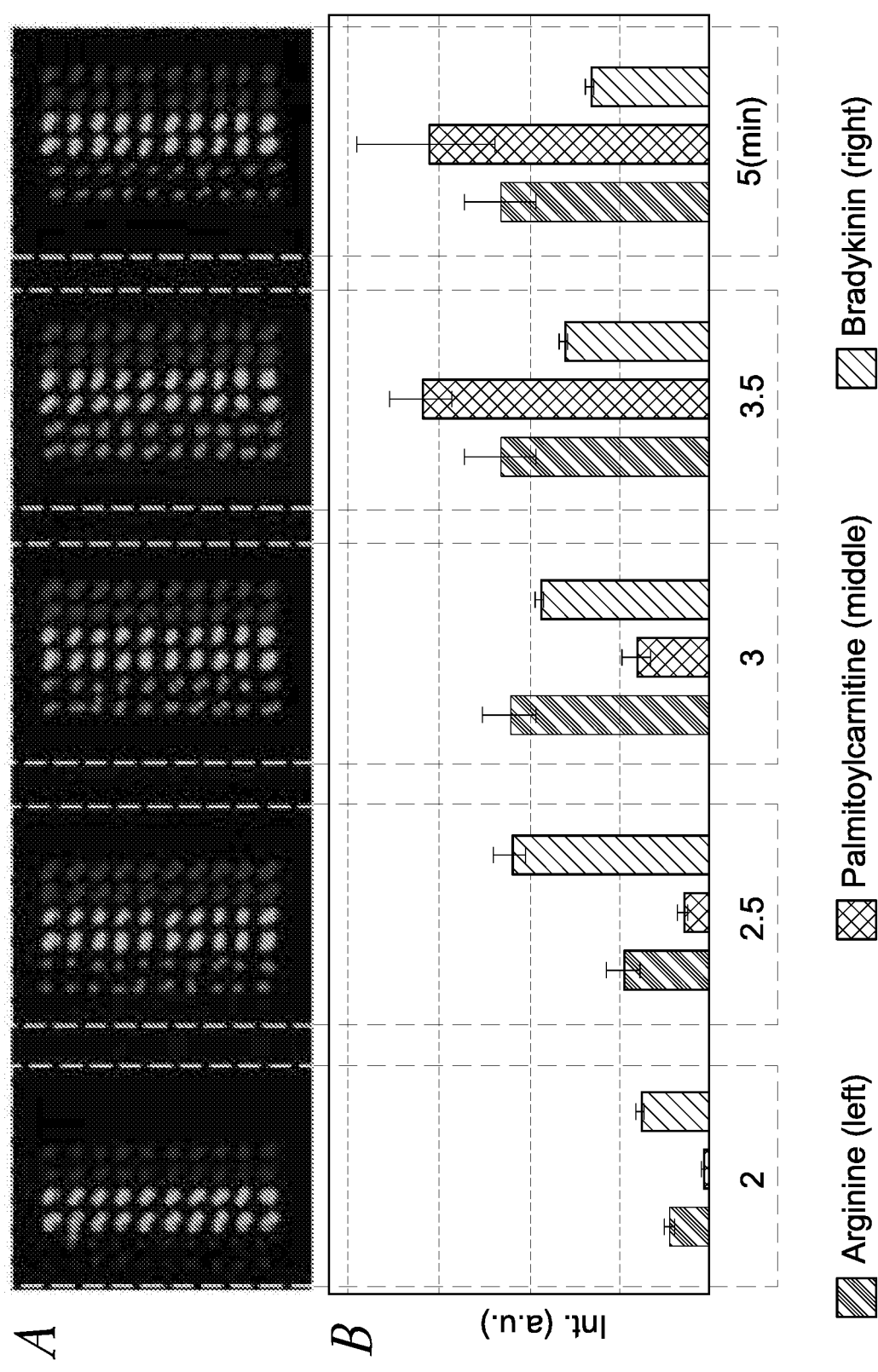
FIG. 4 depicts a sensitivity comparison of NIMS substrates prepared with black silicon under variable etching time (panels A and B). Arginine (left), Palmitoylcarnitine (middle), and bradykinin (right) were analyzed.

The mass spectra of each of three analytes on each substrate in FIG. 3 were averaged, and their peak intensities are plotted versus substrate ICP exposure time, in FIG. 4 panel B. Each analyte shows a unique dependence on the surface morphology of the substrate. Arginine showed a gradual increase of its signal intensity while the signal of pamiltoylcarnitine exponentially grew as up to 5 min exposure time. For bradykinin, its signal rapidly rose, reaching a maximum using the substrate with 2.5 min etching time. The bradykinin sample intensity gradually decreased with exposure time. These results indicate the surface structures of semiconductor substrates partly determine the ionization process of different analytes. These results collectively show that surface parameters controlled by the method of sample preparation determine the sensitivity of mass spectrometry detection of analytes.

This surprising finding of selectivity of these black silicon substrates to different analyte molecules is very exciting since it may allow targeting of specific analytes based on surface structures of NIMS substrates. The unique selectivity feature of substrates may allow tuning a substrate to an target.

Effect of Exposure Temperature on Surface Morphology.

Figure 5:
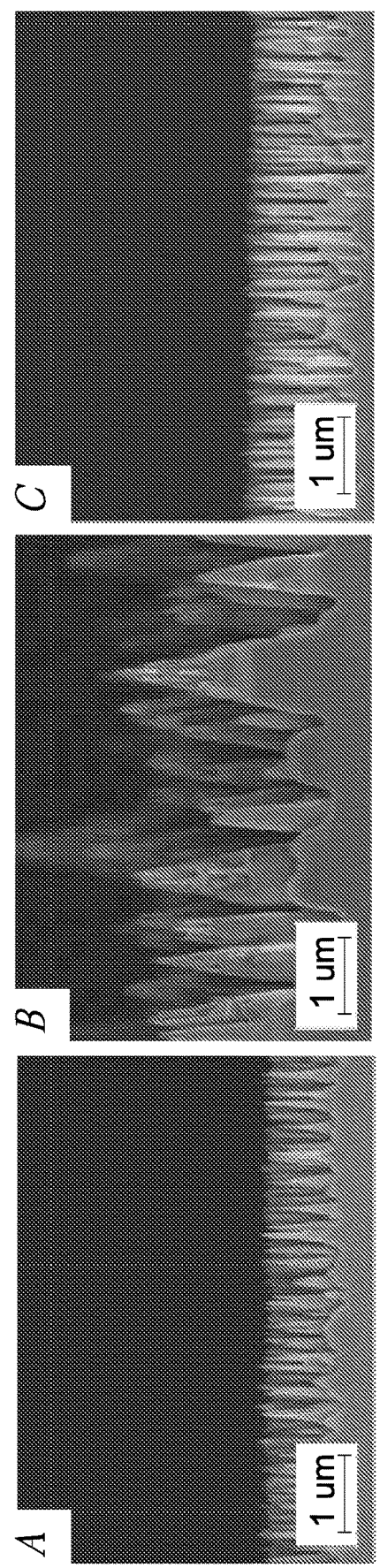
FIG. 5 shows SEM images with a cross-sectional view of black silicon surfaces obtained at different conditions: panel A, $SF_6/O_2$ 34/16 sccm/sccm, −120° C., 5 min; panel B, $SF_6/O_2$ 34/16 sccm/sccm, −80° C., 6.5 min; and panel C, $SF_6/O_2$ 30/20 sccm/sccm, −80° C., 6.5 min.

The substrate temperature during ICP surface treatment was varied from −120° C. to −80° C. At −80° C. with a SF$_6$/O$_2$ 34/16 sccm/sccm gas flow rate, etching occurred only when the substrate was exposed for longer than 6.5 min. FIG. 5 panel A and FIG. 5 panel B show the SEM images of semiconductor substrates fabricated at −120° C., and −80° C., respectively. The slower etching rate is attributed to decreased passivation of the SiO$_x$F$_y$ at higher substrate temperature (−80° C.). Increasing the oxygen concentration compensates for this effect by increasing passivation as shown in FIG. 5 panels B-C where oxygen is raised from 16 sccm to 20 sccm with the total gas flow rate fixed at 50 sccm. Therefore, at the higher temperature and oxygen concentration, the semiconductor pillars appear to be more homogeneous and thinner with the height of ~1 μm, and high aspect ratio of ~8.7 FIG. 5 panel C as compared to the low temperature low oxygen concentration FIG. 5 panel A. Given the higher surface area of this substrate, as proposed previously, lower laser intensity was required for gas phase ion generation on this sample.

Figure 6:
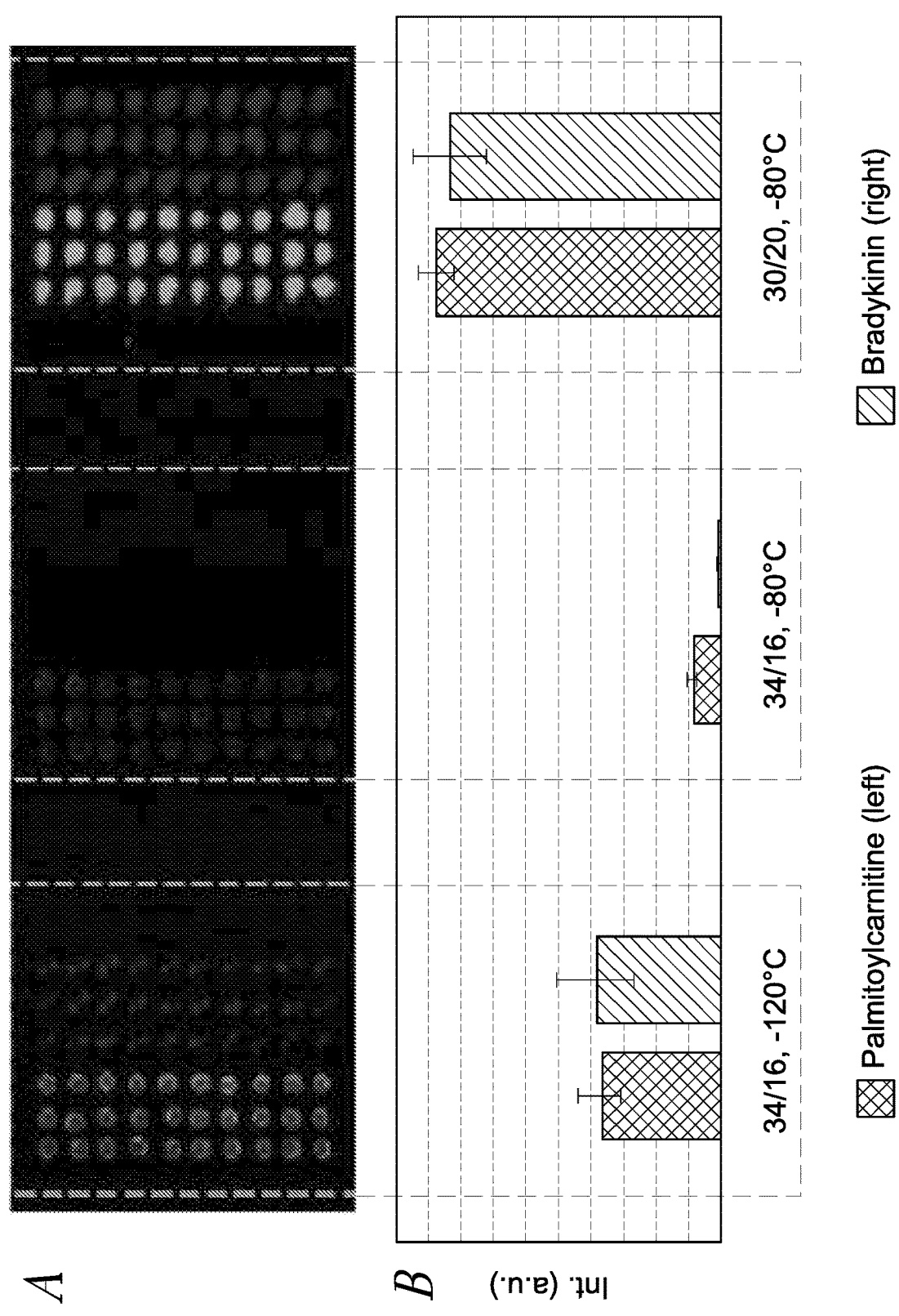
FIG. 6 depicts a sensitivity comparison of NIMS substrates prepared with black silicon at different etching temperatures (panels A and B). Palmitoylcarnitine (left) and bradykinin (right) samples were used, and their NIMS imaging results are shown in panel A while averaged signal intensities and standard deviations shown in panel B (n=30).

FIG. 6 shows the results of NIMS sensitivity measurements of these substrates using streptomycin and bradykinin as analytes. The substrate obtained at −80° C., SF$_6$/O$_2$ 34/16 sccm/sccm reveals the lowest sensitivity for both analytes. As discussed in 1.1 and 1.2, its large pillar depth FIG. 5 panel B can inhibit release of some analyte molecules, while higher melting point slows surface reorganization. The substrate prepared at −80° C., SF$_6$/O$_2$ 30/20 sccm/sccm shows strong NIMS signals of both streptomycin and bradykinin. The high NIMS sensitivity of this substrate is attributed to its fine vertical pillar features with the combined features of high aspect ratio and <1 μm pillar depth. These results collectively show that surface parameters controlled by the method of sample preparation determine the sensitivity of mass spectrometry detection of analytes.

Example 3

Analytical Sensitivity Investigation

Concentration Dependence of Various Samples.

Figure 7:
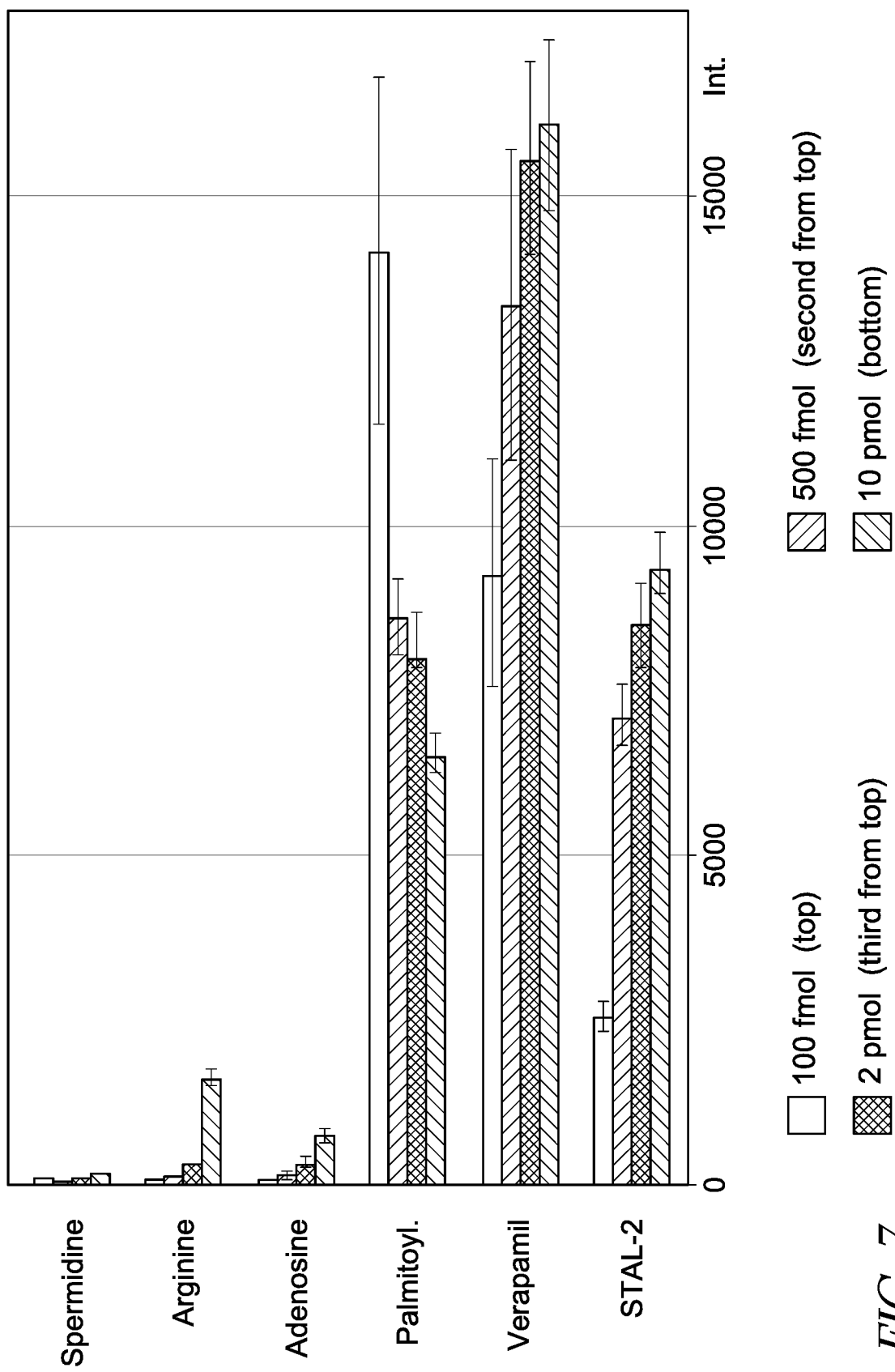
FIG. 7 shows the results of a sensitivity study of black silicon substrates etched for 6.5 min at −80° C., $SF_6/O_2$ 30/20 sccm/sccm flow rate using a variety of molecules with analyte amounts of 100 fmol (top), 500 fmol (second from top), 2 pmol (third from top), 10 pmol (bottom) (n=5).

Substrates prepared under various conditions were tested for sensitivity in NIMS analysis. Substrates were treated by etching at −80° C., SF$_6$/O$_2$ 30/20 sccm/sccm, 6.5 minutes exposure (the same etching conditions used in preparation depicted in FIG. 5 panel C). A variety of molecules within a molecular weight range of 100 to 1000 g/mole were chosen. The samples included an amino acid, a lipid, a drug, and a peptide (spermidine, arginine, adenosine, pamiltoylcarnitine, verapamil, STAL-2). The amount of these samples deposited onto the substrates was varied from 10 pmol to 100 fmol. Correlations of sample quantity and averaged NIMS signal for each analyte is presented in (FIG. 7). Each of these diverse analytes can be ionized using methods described here, and were detected by NIMS analysis. The signal intensities of spermidine, arginine, adenosine, verapamil, and STAL-2 are proportional to the amount deposited on the substrates. Interestingly, pamiltoylcarnitine shows an unexpected concentration dependence.

Library Study.

Figure 18:
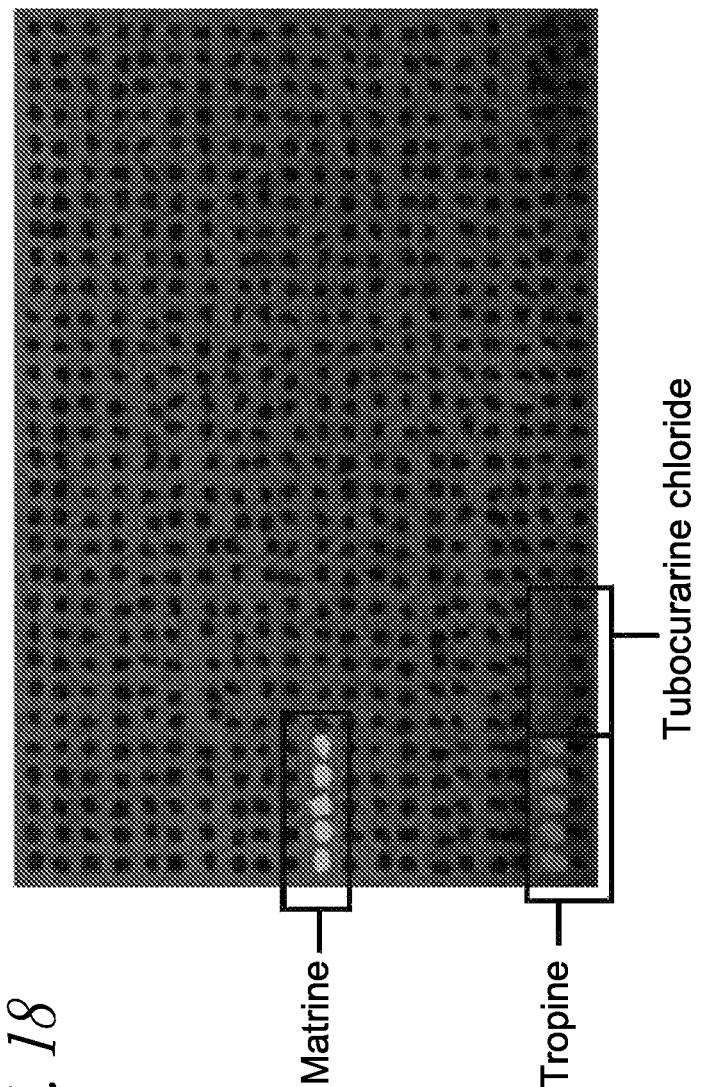
FIG. 18 shows a library containing 118 secondary metabolites. Three compounds (tropine, matrine, tubocurarine chloride) as well as background are displayed in this image to show the printed sample spot patterns. Each analyte was applied in 5-fold replicate.

To more broadly examine the types of compounds that can be detected with reasonable sensitivity, a natural product library containing 118 secondary metabolites was screened with 5 replicates at 250 fmol of each compound applied to a substrate prepared at −80° C., SF$_6$/O$_2$ 30/20 sccm/sccm (FIG. 18). Based on the NIMS imaging results (Table 1), ~50% of the compounds were detectable corresponding to their exact mass and ~30% of the compounds showed S/N (signal to noise) greater than 5/1. In general, the highest signals were detected from hydrophobic molecules containing protonatable nitrogen atoms. These results collectively show the wide range of sample types that can be ionized according to the methods and materials described herein.

Detection Limit.

Figure 8:
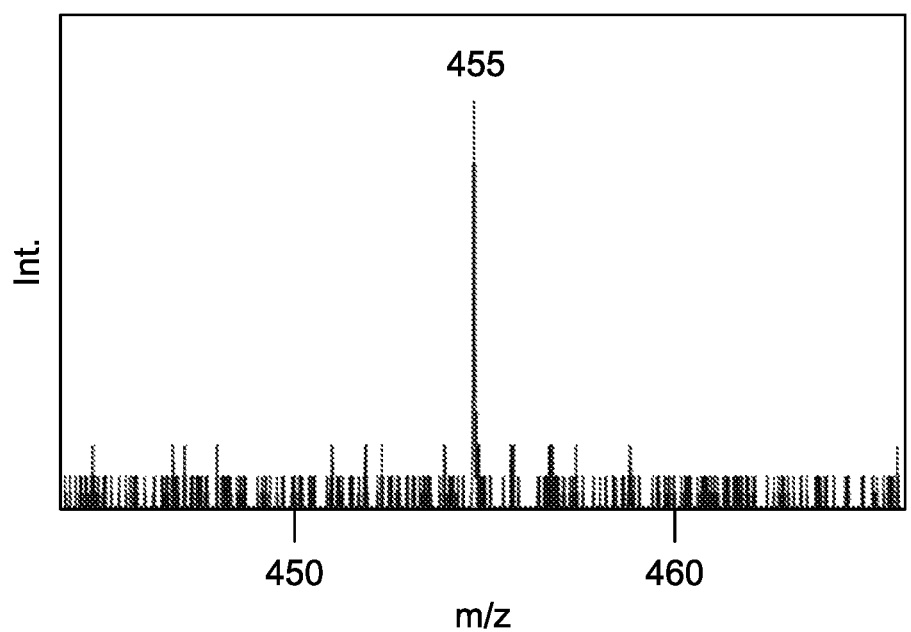
FIG. 8 is the mass spectrum of 10 attomole verapamil spotted on a black silicon NIMS substrate ($SF_6/O_2$ 30/20 sccm/sccm, −80° C., 6.5 min). Single laser shot (2000 laser power) was used here.

A sample of 10 attomole verapamil in 1:9 methanol:water solvent was spotted on a substrate prepared by ICP exposure for 6.5 min at −80° C., SF$_6$/O$_2$ 30/20 sccm/sccm, along with an initiator. The sample was irradiated with a single shot at 2000 laser power (arbitrary instrument units). Mass spectrometric detection was successful at the attomole level (FIG. 8). These results show the usefulness of the methods and materials described herein in ionizing extremely small samples. Many applications will benefit from this sensitivity. One of skill in the art will appreciate that the sensitivity of the methods and materials provided here may be higher under other conditions.

TABLE 1

Average signal intensity obtained by analysis of a small molecule library. Noise level is ~30 counts.

| Compound | m/z | Ion Intensity [a.u.] |
|---|---|---|
| Spartein sulfate-5H2O | 235.22 | 23333 |
| Berberine-HCl | 336.12 | 22901 |
| Lappaconitine | 585.32 | 8444 |
| Bulleyaconotine A | 644.34 | 7895 |
| Vindoline | 457.23 | 6751 |
| (+)-Tubocurarine chloride | 609.30 | 6294 |
| Oxyacanthine sulfate | 609.30 | 3562 |
| Matrine | 249.20 | 3522 |
| Cepharanthine | 607.28 | 3071 |
| Hydrocotarnine-HBr | 222.11 | 2150 |
| Vinorelbine | 779.40 | 2039 |
| Corynanthine | 355.20 | 1908 |
| Cephaeline-HBr | 467.29 | 1856 |
| _-Solanine | 868.51 | 1692 |
| Zerumbone | 219.17 | 1392 |
| Catharanthine | 337.19 | 1300 |
| Tropine | 142.12 | 875 |
| 9,10-Dihydrolysergol | 257.16 | 856 |
| Evodiamine | 304.14 | 830 |
| Sinomenine | 330.17 | 823 |
| Anisodamine | 306.17 | 764 |
| Sedanolide | 195.14 | 692 |
| Solasodine | 414.34 | 679 |
| Yangonin | 259.10 | 666 |
| Ginkgolide A | 409.15 | 568 |
| Gelsemine-HCl | 323.18 | 562 |
| Rutaecarpine | 288.11 | 529 |
| Vincamine | 355.20 | 477 |
| (±)-Anabasine | 163.12 | 450 |
| Salsoline | 194.12 | 437 |
| Salsolodine | 208.13 | 424 |
| Chlorogenic acid | 355.10 | 405 |
| Securinine | 218.12 | 352 |
| Senecionine | 336.18 | 320 |
| Diosmetine | 301.07 | 307 |
| Geraldol | 301.07 | 235 |
| Formononetin | 269.08 | 228 |
| Biochanin A | 285.08 | 209 |
| Lupinine | 170.15 | 196 |
| 5,6-Dehydrokawain | 229.09 | 156 |
| R(+)-Schisandrin A | 417.23 | 130 |
| Flavokawain A | 315.12 | 124 |
| Harringtonine | 532.25 | 124 |
| (−)-Cytisine | 191.12 | 124 |
| Galangine | 271.06 | 124 |
| L-Theanine | 175.11 | 111 |
| Scopoletin | 193.05 | 98 |
| Brassinin | 237.05 | 98 |
| Coumestrol | 269.04 | 98 |
| Euphorbiasteroid | 553.28 | 84 |
| S(−)-Schisandrin A | 401.20 | 71 |
| Bis demethoxycurcumin | 309.11 | 71 |
| Xanthotoxin | 217.05 | 65 |
| Diindolylmethane | 247.12 | 65 |
| Salinomycin | 751.50 | — |
| Digitoxin | 765.44 | — |
| Myristicin | 193.09 | — |
| Dicoumarol | 337.07 | — |
| Artemesinin | 283.15 | — |
| Asiatic acid | 489.36 | — |
| Auraptene | 299.16 | — |
| Vulpinic acid | 323.09 | — |
| Bergenin | 329.09 | — |
| Cafestol | 317.21 | — |
| Cafestol acetate | 359.22 | — |
| Cryptotanshinone | 297.15 | — |
| 4'-Demethylpipo-dophyllotoxin | 401.12 | — |
| Mitomycin C | 335.13 | — |
| Methysticin | 275.09 | — |
| Thymoquinone | 165.09 | — |
| Dihydrotanshinone | 279.10 | — |
| Azomycin | 114.03 | — |
| Diosmin | 609.18 | — |
| Ecdysone | 465.32 | — |
| _-Ecdysone | 481.32 | — |
| Hesperitine | 303.09 | — |
| Hesperidine | 611.20 | — |
| Honokiol | 267.14 | — |
| Hypocrellin A | 547.16 | — |
| Hypocrellin B | 529.15 | — |
| Lagochiline | 357.26 | — |
| Limonin | 471.20 | — |
| Madecassic acid | 505.35 | — |
| Magnolol | 267.14 | — |
| Minocycline-HCl | 458.19 | — |
| Naringin | 581.19 | — |
| Indole-3-acetic acid | 176.07 | — |
| 16-Oxocafestol | 285.18 | — |
| 16-Oxokahweol | 283.17 | — |
| Panaxadiol | 461.40 | — |
| Panaxatriol | 477.39 | — |
| GERI-BP002-A | 341.25 | — |
| Pimaricin | 666.31 | — |
| Podophyllotoxin | 415.14 | — |
| Rubescensin A | 365.20 | — |
| Rutin | 611.16 | — |
| Santonin | 247.13 | — |
| Schisantherin A | 537.21 | — |
| Silybine | 483.13 | — |
| Silymarin | 483.13 | — |
| Solanesol | 631.58 | — |
| Bergapten | 217.05 | — |
| Betulin | 443.39 | — |
| Dihydrorobinetine | 305.07 | — |
| Flavanomarein | 451.12 | — |
| Lavendustin B | 366.13 | — |
| Lavendustin A | 382.13 | — |
| Verruculogen | 514.25 | — |
| Amphotericin B | 924.50 | — |
| Amygdalin | 458.17 | — |
| Aphidicolin | 339.25 | — |
| Arbutin | 273.10 | — |
| Sclerotiorin | 391.13 | — |
| Bleomycin sulfate | 1414.52 | — |
| Chartreusin | 641.19 | — |
| Ferulic acid | 195.07 | — |
| Bakuchiol | 257.19 | — |
| Indole-3-carbinol | 148.08 | — |

Example 4

Reproducibility of ICP Etching Process.

Figure 9:
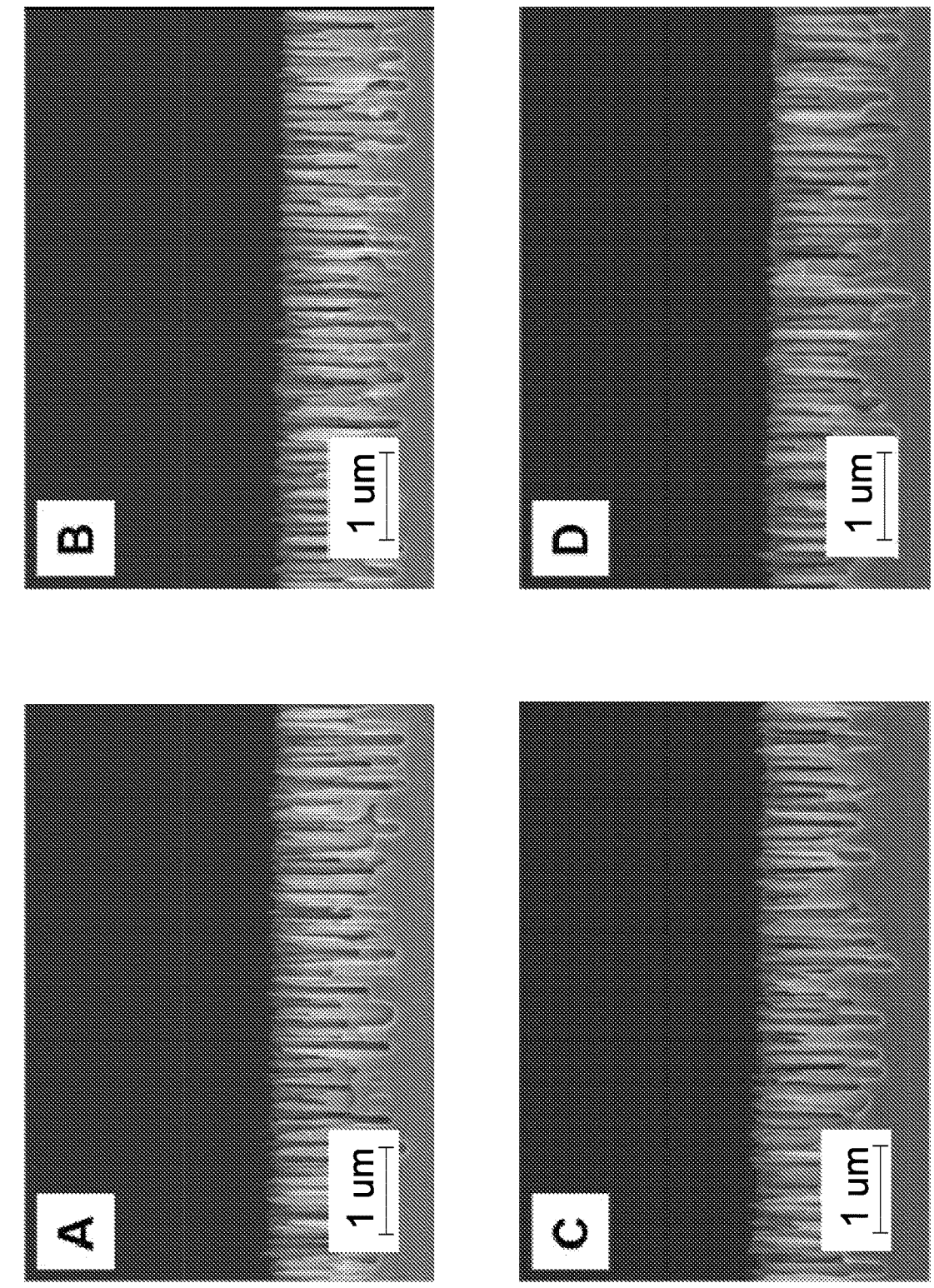
FIG. 9 shows SEM images with cross-sectional view of four replicates of black silicon surfaces obtained at same etching condition: $SF_6/O_2$ 30/20 sccm/sccm, −80° C., 6.5 min.

In order to confirm the reproducibility of one possible etching process, SEM imaging of four semiconductor surfaces prepared using identical ICP etching processes was performed (cutaway view of surface, FIG. 9). Each sample was prepared at −80° C., using $SF_6/O_2$ 30/20 sccm/sccm, and 6.5 minutes exposure. Upon visualization, the morphology of the samples was found to be very consistent. These results show that surface morphology is reproducible following treatment according to a given set of etching parameters.

Comparison of Etching Processes.

Figure 10:
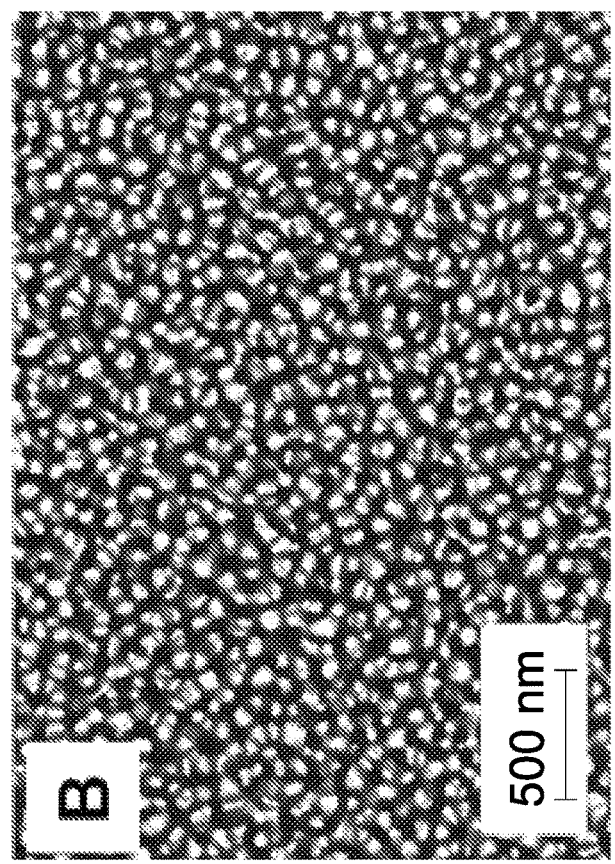
FIG. 10 shows SEM images with top views of substrates obtained by HF electrochemical etching (panel A), and $SF_6/O_2$ ICP etching (panel B). The light areas indicate elevated areas, and the dark areas indicate depressed areas, relative to the average position of the substrate surface.
Figure 10:
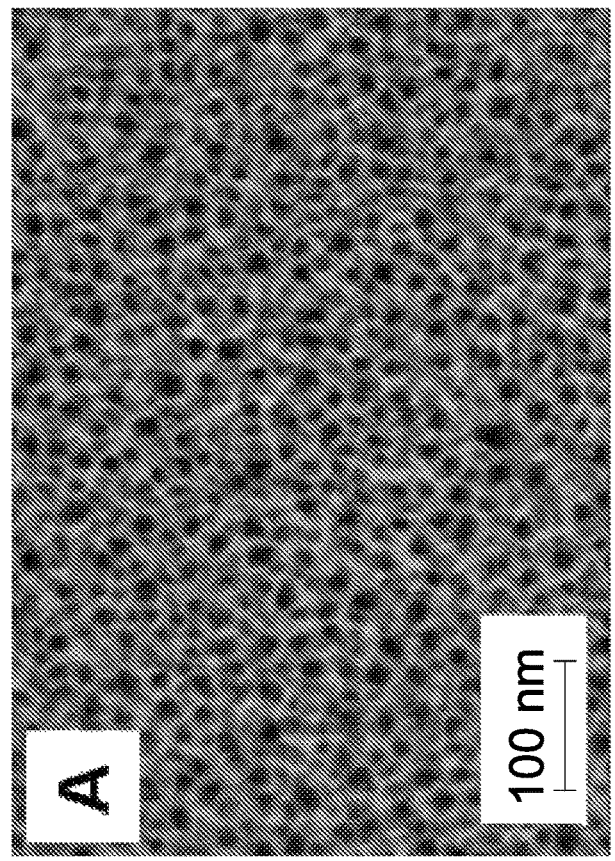

A surface prepared by ICP etching was compared to a surface prepared by HF electrochemical etching as described in US Patent Application No. 2008/0128608. The comparison can be seen in FIG. 10 (top view, SEM imaging). The sample produced by ICP plasma treatment exhibits surface peaks.

Initiator Adsorption.

Figure 11:
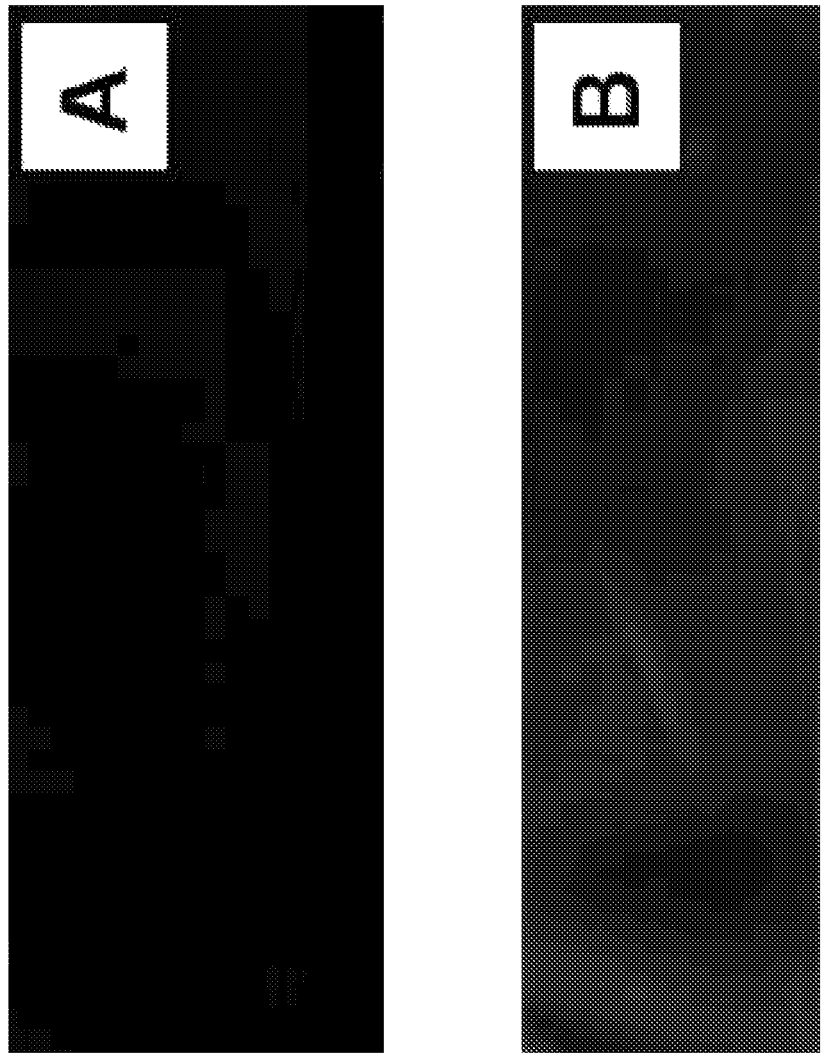
FIG. 11 shows a black silicon NIMS substrate in contact with an initiator before (panel A) and after (panel B) thermal heating.

A substrate prepared by ICP etching was treated with the initiator bis(heptadecafluoro-1,1,2,2-tetrahydrodecyl)tetramethyldisiloxane, and the resultant treated substrate was heated. The initiator begins to desorb and form a visible film upon heating, which makes the surface appear wet (FIG. 11). These results show that the initiator is in contact with the material surface.

Figure 12:
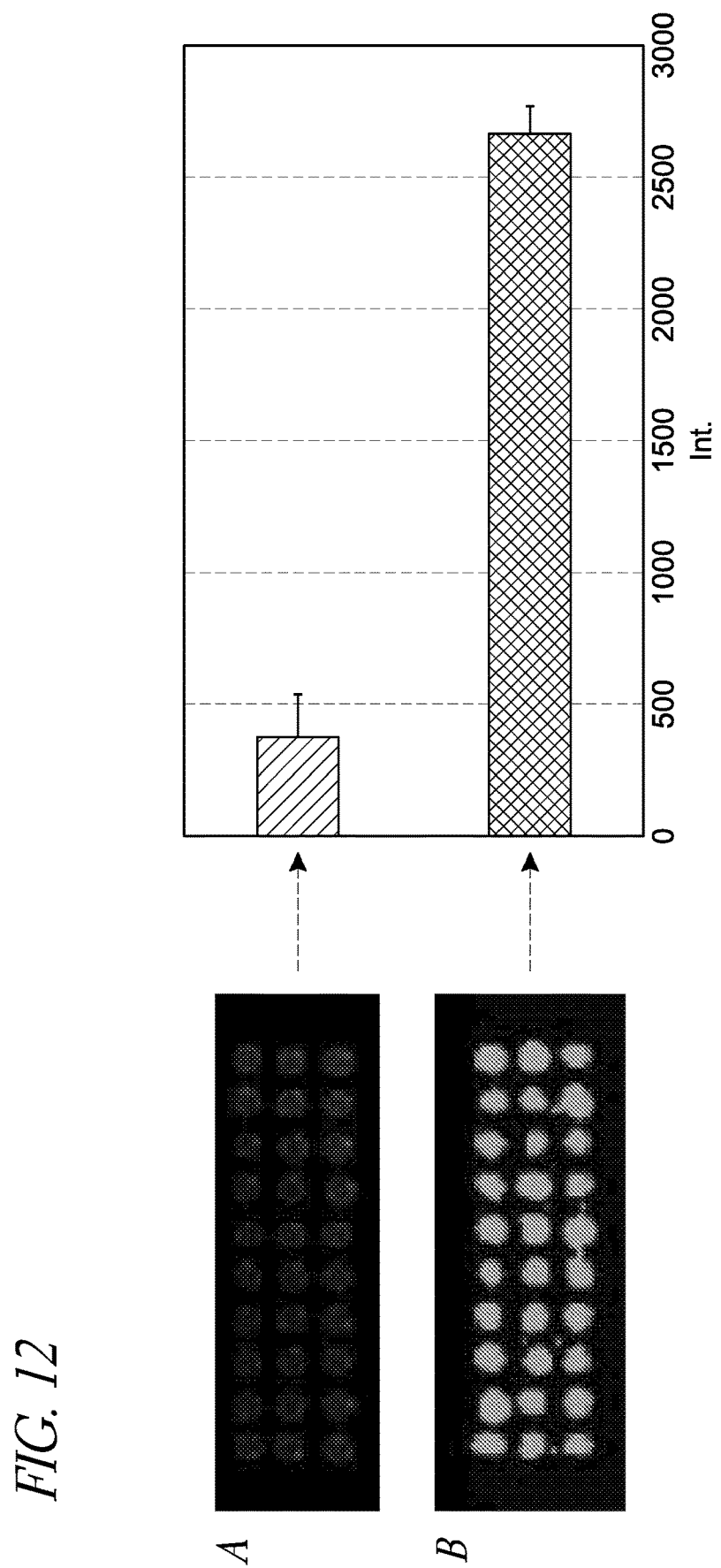
FIG. 12 depicts a sensitivity comparison of: panel A) shows sample applied to substrate with no initiator coating and panel B) shows sample applied to substrate with initiator coating. Palmitoylcarnitine was used as analyte, and its averaged signal intensity detected from the initiator-coated substrate is one order of magnitude higher than the signal from the uncoated substrate, as seen in the detected intensity graph to the right.

A MS sensitivity comparison of black silicon as mass spectrometry substrates with and without initiator was performed: FIG. 12 panel A, with no initiator coating and FIG. 12 panel B, with BisF17 initiator coating. Palmitoylcarnitine was used as analyte, and its averaged signal intensity was from the initiator-coated substrate is one order of magnitude higher than the signal from the substrate that was not coated with initiator.

Example 5

Effect of Irradiation Intensity

This example illustrates a non-limiting demonstration of the behavior of substrates according to one embodiment of the disclosure upon irradiation.

Surface Reorganization.

Figure 14:
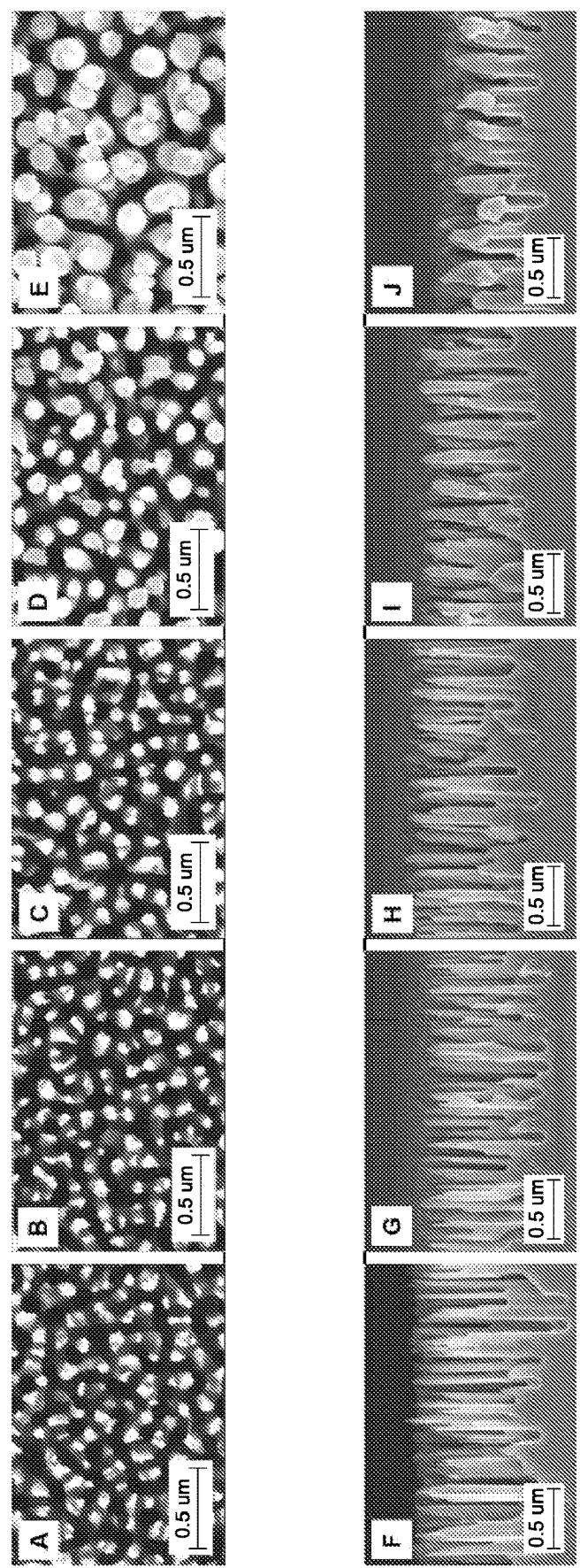
FIG. 14 depicts laser ablation of black silicon surfaces under laser power 0, 3000, 4000, 5000, and 6000 (panels A-J). SEM images in panels A-E show the top views, respectively. Panels F-J show their relative SEM images in cross sectional views. In general, ion detection intensity increases dramatically between 3000 and 4000 laser intensity, which was the threshold for surface rearrangement in this example.
Figure 15:
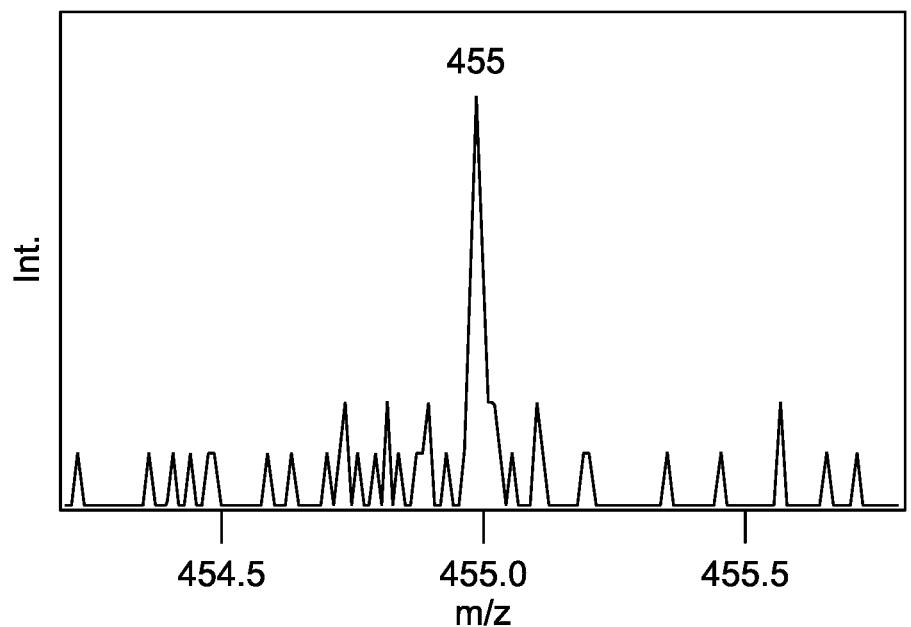
FIG. 15 depicts mass spectra of 500 yactomole verapamil spotted on porous silicon NIMS substrates (panels A and B). In panel A, the spectrum is collected with a single shot laser, and in panel B, the spectrum is accumulated from 30 single shot spectra.
Figure 15:
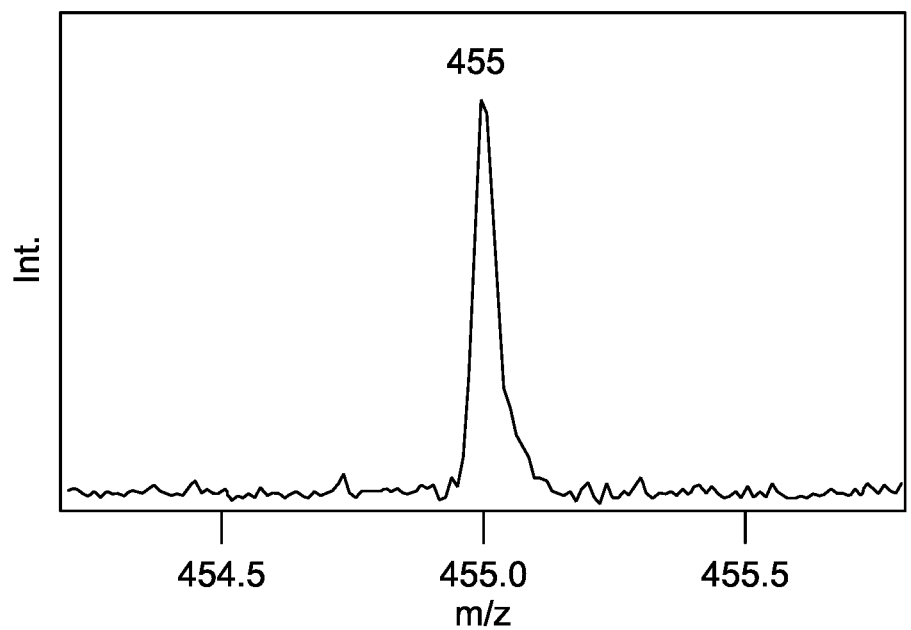

Substrates formed by ICP etching were irradiated by lasers of varying intensities. As can be seen in FIG. 14, the surface features undergo a reorganization process as the laser intensity is increased. The top row of images depicts a top view of the surfaces following irradiation, while the bottom row of images depict a side or cutaway view. While at a laser power of 3000 (arbitrary instrument units), little or no surface reorganization occurs, at a power of 4000 the surface structures begin to reorganize visibly. The deterioration of surface structures is more advanced at 5000, while at 6000 a substantial reorganizing process has occurred.

Effect of Laser Intensity on NIMS Sensitivity.

Figure 13:
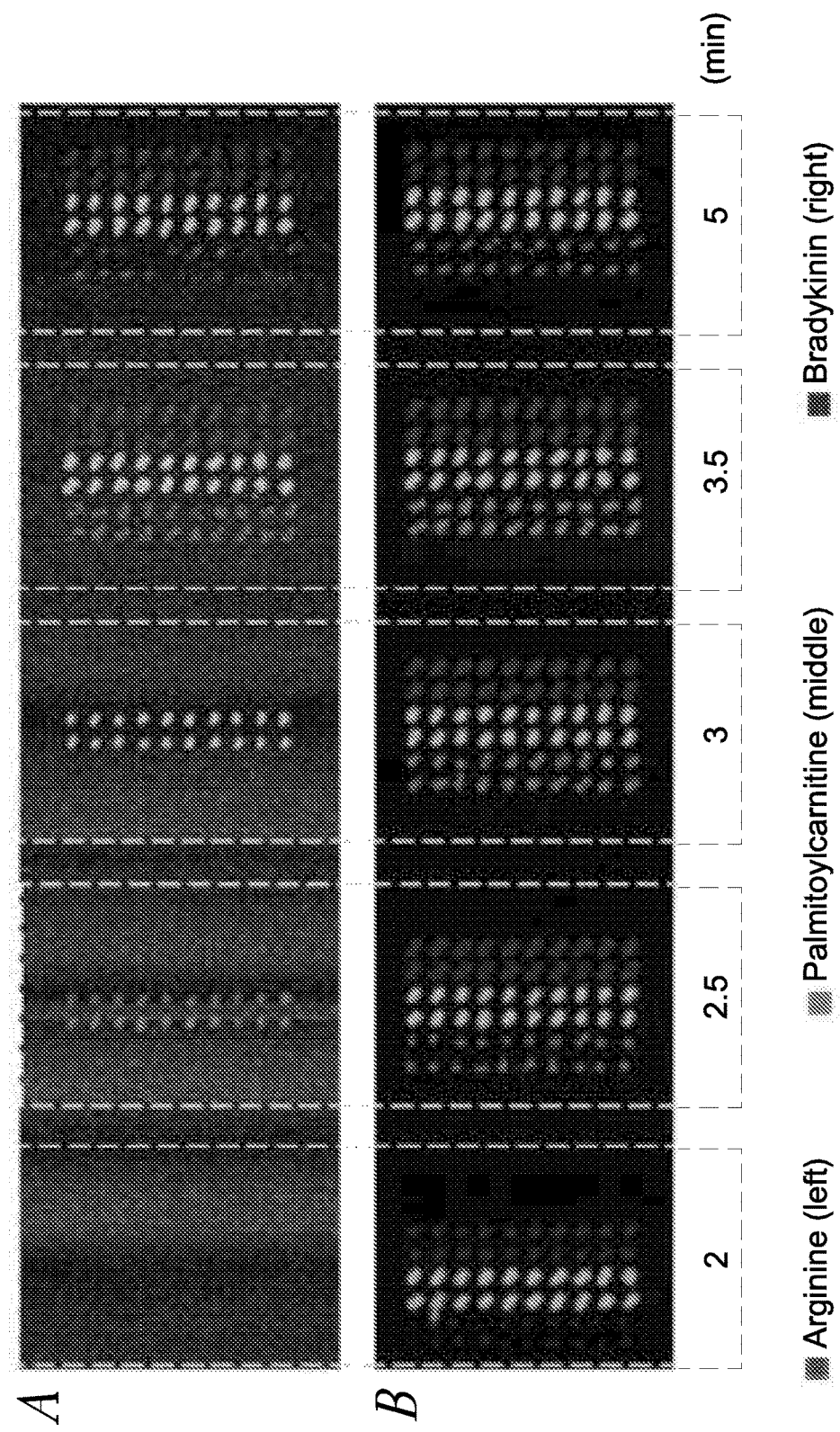
FIG. 13 shows a laser intensity dependent NIMS imaging (panels A and B). Panel A shows the NIMS image collected under 2000 laser power, and Panel B shows the image collected at 3000 laser power for various plasma etching times. Panels A-B depict Arginine (the two columns to the left), palmitoylcarnitine (the two columns in the middle), and bradykinin (the two columns in the rightmost) traces for each etching time.

Substrates prepared by ICP etching were treated with initiator, and loaded with samples of analytes as described above. Arginine, pamiltoylcarnitine, and bradykinin were chosen. The samples were irradiated at a laser power of 2000 (FIG. 13 panel A) and 3000 (FIG. 13 panel B) and analyzed by mass spectrometry. As can be seen in FIG. 13, the samples irradiated with 3000 laser power produce a much stronger signal. These results collectively show that higher laser power, corresponding in this example with increased surface reorganization, leads to enhanced ionization. Measurement of the laser intensities reflect the instrument settings which control the rotation of a gradient neutral density filter and are therefore not linear. Measurement of actual laser intensity was not possible. The signals of these analytes increased dramatically when laser intensity was increased. Laser intensity-dependent surface reorganization is captured by SEM images in both top-view and cross-sectional views which show that NIMS ion generation corresponded to SEM observable changes in surface morphology.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composition for ionizing a target, comprising:
    a structured semiconductor substrate comprising a plurality of microscale or nanoscale conical pillars formed by etching the structured semiconductor substrate with an inductively coupled plasma, wherein all of the plurality of microscale or nanoscale pillars in the structured semiconductor substrate are upright in orientation, wherein the height of the plurality of microscale or nanoscale pillars ranges from about 50 nm to about 10 µm; and
    an initiator for promoting ionization of an irradiation-ionizable target, wherein the initiator is reversibly absorbed onto the surface of the structured semiconductor substrate comprising the plurality microscale or nanoscale pillars and trapped by two or more of the plurality of microscale or nanoscale pillars, wherein the structured semiconductor substrate undergoes surface reorganization upon laser irradiation resulting in ionization of the target, whereby the height of microscale or nanoscale pillars of the plurality of microscale or nanoscale pillars decreases and/or the width of nanoscale or nanoscale pillars of the plurality of microscale or nanoscale pillars increases, thereby enhancing the ionization of the target.

2. The composition of claim 1, wherein the structured semiconductor substrate comprises a semiconductor selected from the group consisting of Group IV semiconductors, diamond, Group I-VII semiconductors, CuF, CuCl, CuBr, CuI, AgBr, AgI, Group II-VI semiconductors, BeO, BeS, BeSe, BeTe, BePo, MgTe, ZnO, ZnS, ZnSe, ZnTe, ZnPo, CdS, CdSe, CdTe, CdPo, HgS, HgSe, HgTe, Group III-V semiconductors, BN, BP, BAs, AlN, AlP, AlAs, AlSb, GaN, GaP, GaSb, InN, InAs, InSb, sphaelerite structure semiconductors, MnS, MnSe, 3-SiC, $Ga_2Te_3$, $In_2Te_3$, $MgGeP_2$, $ZnSnP_2$, $ZnSnAs_2$, Wurtzite Structure Compounds, NaS, MnSe, SiC, MnTe, $Al_2S_3$, $Al_2Se_3$, I-II-VI2 semiconductors, $CuAlS_2$, $CuAlSe_2$, $CuAlTe_2$, $CuGaS_2$, $CuGaSe_2$, $CuGaTe_2$, $CuInS_2$, $CuInSe_2$, $CuInTe_2$, $CuTiS_2$, $CuTiSe_2$, $CuFeS_2$, $CuFeSe_2$, $CuLaS_2$, $AgAS_2$, $AgAlSe_2$, $AgAlTe_2$, $AgGaS_2$, $AgGaSe_2$, $AgGaTe_2$, $AgInS_2$, $AgInSe_2$, $AgInTe_2$, $AgFeS_2$, and silicon.

3. The composition of claim 1, wherein the plurality of pillars comprises two or more semiconductor pillars.

4. The composition of claim 1, wherein the initiator is a fluorinated molecule.

5. The composition of claim 1, wherein the initiator is selected from the group consisting of lauric acid, polysiloxanes, chlorosilanes, methoxy silanes, ethyoxy silanes, fluorous siloxanes and fluorous silanes.

6. The composition of claim 1, wherein the structured semiconductor substrate is a black silicon substrate.

7. The composition of claim 1, wherein the aspect ratio of the plurality of pillars ranges from about 1 to about 10.

8. The composition of claim 1, further comprising a target in contact with the initiator.

9. The composition of claim 8, wherein the target is a constituent of a sample selected from a biological sample, an environmental sample, a clinical sample, a forensic sample, or a combination thereof.

10. A method for ionizing a target, comprising:
    providing a structured semiconductor substrate having a plurality of microscale or nanoscale conical pillars formed by etching the structured semiconductor substrate with an inductively coupled plasma, wherein all of the plurality of microscale or nanoscale pillars in the structured semiconductor substrate are upright in orientation, wherein the height of the plurality of microscale or nanoscale pillars ranges from about 50 nm to about 10 µm;
    applying an initiator to the structured semiconductor substrate, thereby the initiator is reversibly absorbed onto the surface of the structured semiconductor substrate having the plurality of microscale or nanoscale pillars and trapped by two or more of the plurality of microscale or nanoscale pillars;
    delivering a target to the structured semiconductor substrate that the initiator is reversibly absorbed onto to form a target-loaded substrate; and
    irradiating the target-loaded substrate, thereby ionizing the target, wherein upon said irradiation resulting in the ionization of the target, the target-loaded substrate undergoes surface reorganization, whereby the height of microscale or nanoscale pillars of the plurality of microscale or nanoscale pillars decreases and/or the width of microscale or nanoscale pillars of the plurality of microscale or nanoscale pillars increases, and wherein the surface reorganization enhances the ionization of the target.

11. A method for making a composition for ionizing a target, comprising:
    providing a semiconductor material;
    etching the semiconductor material in the presence of an inductively coupled plasma to produce a structured semiconductor substrate, wherein the structured semiconductor substrate comprises a plurality of microscale or nanoscale conical pillars and all of the plurality of microscale or nanoscale pillars in the structured semiconductor substrate are upright in orientation, wherein the height of the plurality of microscale or nanoscale pillars ranges from about 50 nm to about 10 µm; and
    contacting the structured semiconductor substrate with an initiator, thereby the initiator is reversible absorbed onto the surface of the structured semiconductor substrate comprising the plurality of microscale or nanoscale pillars and trapped by two or more of the plurality of microscale or nanoscale pillars, wherein upon laser irradiation of the structured semiconductor substrate resulting in ionization of a target, the structured semiconductor substrate undergoes surface reorganization comprising the height of one or more microscale or nanoscale pillars of the plurality of microscale or nanoscale pillars decreasing and/or the width of one or more microscale or nanoscale pillars of the plurality of microscale or nanoscale pillars increasing, and wherein the surface reorganization enhances the ionization of the target.

12. The composition of claim 1, wherein the structured semiconductor substrate is a p-type semiconductor, wherein the semiconductor is crystalline silicon, and wherein the semiconductor has a <100> orientation.

13. The composition of claim 1, wherein the initiator is trapped by at least half of the plurality of microscale or nanoscale pillars.

14. The composition of claim 1, wherein the initiator desorbs from the surface of the structured semiconductor substrate upon an increase and/or a decrease in temperature to form a visible film on the structured semiconductor substrate.

15. The composition of claim 1, wherein at least one of the plurality of microscale or nanoscale pillars has a conical shape and/or a triangular sloped surface.

16. The composition of claim 1, wherein at least one of the plurality of microscale or nanoscale pillars has a non-cylindrical shape.

17. The method of claim 10, wherein the initiator is a fluorinated molecule.

18. The method of claim 10, wherein the initiator is selected from the group consisting of lauric acid, polysiloxanes, chlorosilanes, methoxy silanes, ethyoxy silanes, fluorous siloxanes and fluorous silanes.

19. The method of claim 10, wherein the average aspect ratio of the plurality of pillars is about 1 to about 10.

20. The method of claim 10, wherein the target is a constituent of a sample selected from a biological sample, an environmental sample, a clinical sample, a forensic sample, or a combination thereof.

* * * * *